United States Patent
Urbaniak et al.

(10) Patent No.: US 12,066,205 B2
(45) Date of Patent: Aug. 20, 2024

(54) AIRSTREAM SENSOR DEVICES, SYSTEMS AND METHODS

(71) Applicant: EBTRON Inc., Loris, SC (US)

(72) Inventors: Michael J. Urbaniak, Little River, SC (US); David S. Dougan, Myrtle Beach, SC (US); Darryl W. DeAngelis, Longmeadow, MA (US)

(73) Assignee: EBTRON Inc., Loris, SC (US)

( * ) Notice: Subject to any disclaimer, the term of this patent is extended or adjusted under 35 U.S.C. 154(b) by 196 days.

(21) Appl. No.: 17/165,506

(22) Filed: Feb. 2, 2021

(65) Prior Publication Data

US 2021/0247091 A1 Aug. 12, 2021

Related U.S. Application Data

(63) Continuation-in-part of application No. 16/035,183, filed on Jul. 13, 2018.
(Continued)

(51) Int. Cl.
*F24F 11/63* (2018.01)
*F24F 11/46* (2018.01)
(Continued)

(52) U.S. Cl.
CPC ............... *F24F 11/63* (2018.01); *F24F 11/46* (2018.01); *F24F 11/58* (2018.01);
(Continued)

(58) Field of Classification Search
CPC ...................................................... F24F 11/63
See application file for complete search history.

(56) References Cited

U.S. PATENT DOCUMENTS

| | | | |
|---|---|---|---|
| 5,436,852 | A | 7/1995 | Kon |
| 5,675,979 | A | 10/1997 | Shah |

(Continued)

FOREIGN PATENT DOCUMENTS

| | | |
|---|---|---|
| EP | 0415747 A2 | 3/1991 |
| WO | 2014164788 A1 | 10/2014 |

OTHER PUBLICATIONS

*Blend definition in American English | Collins English Dictionary*, https://www.collinsdictionary.com/us/dictionary/english/blend (accessed Mar. 2, 2024).*

(Continued)

*Primary Examiner* — Hyun D Park
(74) *Attorney, Agent, or Firm* — Fox Rothschild LLP

(57) ABSTRACT

Systems/methods for measuring airstream parameters. The methods comprise: measuring a humidity and temperature by sensors of airstream sensor device(s) arranged symmetrically within a single cross-sectional plane of an air flow conveyance structure of an HVAC system; measuring, by absolute pressure sensor(s), a barometric pressure of an atmosphere outside of the air flow conveyance structure; receiving, by a transmitter, humidity measurement values and temperature measurement values from the sensors and barometric pressure value(s) from the absolute pressure sensor(s); computing a velocity weighted temperature value for the airstream based on the temperature measurement values; using the humidity measurement values, the velocity weighted temperature value, and the barometric pressure value to determine a psychrometric property associated with the airstream; and causing operations of the HVAC system, a building automation system or an application controller to be controlled based on the determined psychrometric property.

33 Claims, 12 Drawing Sheets

(NOTE: DIRECTION OF AIRFLOW IS INTO THE PAPER)

Related U.S. Application Data

(60) Provisional application No. 62/969,374, filed on Feb. 3, 2020, provisional application No. 62/532,517, filed on Jul. 14, 2017.

(51) Int. Cl.
  *F24F 11/58* (2018.01)
  *F24F 110/10* (2018.01)
  *F24F 110/20* (2018.01)
  *F24F 110/30* (2018.01)
  *F24F 110/40* (2018.01)

(52) U.S. Cl.
  CPC ....... *F24F 2110/10* (2018.01); *F24F 2110/20* (2018.01); *F24F 2110/30* (2018.01); *F24F 2110/40* (2018.01)

(56) References Cited

U.S. PATENT DOCUMENTS

| | | |
|---|---|---|
| 6,415,617 B1 | 7/2002 | Seem |
| 6,543,932 B1 | 4/2003 | Potter et al. |
| 6,658,931 B1 | 12/2003 | Plumb et al. |
| 2003/0051023 A1 | 3/2003 | Reichel et al. |
| 2003/0205094 A1* | 11/2003 | Plum .................... G01F 1/46 |
| | | 73/861 |
| 2004/0144112 A1 | 7/2004 | He et al. |
| 2006/0234621 A1 | 10/2006 | Desrochers et al. |
| 2007/0137318 A1 | 6/2007 | Desrochers et al. |
| 2007/0205297 A1* | 9/2007 | Finkam ................. F24F 11/30 |
| | | 236/1 C |
| 2009/0064803 A1 | 3/2009 | Pettit et al. |
| 2009/0065595 A1 | 3/2009 | Kates |
| 2010/0088044 A1 | 4/2010 | Vogel et al. |
| 2011/0146651 A1* | 6/2011 | Puranen ................ F24H 9/2064 |
| | | 126/116 A |
| 2011/0277473 A1* | 11/2011 | Courtright .............. F28D 20/00 |
| | | 60/643 |
| 2012/0125558 A1* | 5/2012 | Nortman .................. G01F 1/68 |
| | | 73/204.25 |
| 2012/0155506 A1 | 6/2012 | Nelson et al. |
| 2013/0023198 A1 | 1/2013 | Badenhorst |
| 2014/0083292 A1 | 3/2014 | Weiden |
| 2016/0153674 A1* | 6/2016 | Lancaster ................ F24F 11/30 |
| | | 700/276 |
| 2017/0059187 A1* | 3/2017 | Smith, Jr. ............. F24D 19/109 |
| 2019/0017717 A1* | 1/2019 | Urbaniak ............... G01K 13/02 |
| 2019/0309975 A1 | 10/2019 | Salem et al. |
| 2019/0391052 A1 | 12/2019 | Lavrovsky et al. |
| 2020/0116382 A1* | 4/2020 | Yang ...................... F24F 11/76 |

OTHER PUBLICATIONS

*Weighted Average definition in American English | Collins English Dictionary*, https://www.collinsdictionary.com/us/dictionary/english/weighted-average (accessed Mar. 2, 2024).*

International Search Report and Written Opinion issued in PCT/US2021/016372 dated Apr. 13, 2021.

Supplemental European Search Report dated May 19, 2020 in co-pending European Patent Application No. 18832240.

"ASHRAE Handbook—Fundamentals", published by the American Society of Heating, Refrigeration and Air-Conditional Engineers (ASHRAE) in 2021, p. 3.1, 3.2, 3.5, 18.18 and 18.19.

U.S. Appl. No. 16/035,183, filed Jul. 13, 2018.

Extended European Search Report mailed Dec. 22, 2022 in corresponding European Patent Application No. 21750113.9 (12 pages).

* cited by examiner (NOTE: DIRECTION OF AIRFLOW IS INTO THE PAPER)

70

→ 72 RECEIVING, AT A TRANSMITTER, A PLURALITY OF ELECTRICAL SIGNALS FROM AN AIRSTREAM SENSOR DEVICE POSITIONED IN AN AIRSTEAM, THE ELECTRICAL SIGNALS BEING INDICATIVE OF A TEMPERATURE, A THERMAL DISPERSION AIRFLOW, ABSOLUTE PRESSURE AND A RELATIVE HUMIDITY OF THE AIRSTREAM

→ 74 PROCESSING, AT THE TRANSMITTER, THE ELECTRICAL SIGNALS TO OBTAIN A CALCULATED TEMPERATURE, A CALCULATED AIRFLOW, DENSITY, DEW POINT AND AN ENTHALPY OF THE AIRSTREAM

→ 76 TRANSMITTING THE CALCULATED TEMPERATURE, THE CALCULATED AIRFLOW, DENSITY, DEW POINT, AND THE ENTHALPY TO AN ACQUIRER

→ 82 RECEIVING HUMIDITY, AIRFLOW, DEW POINT, DENSITY AND TEMPERATURE MEASUREMENTS FOR AN AIRSTREAM AT A FIRST DEVICE

→ 84 CALCULATING DENSITY, DEW POINT AND ENTHALPY OF THE AIRSTREAM AT THE FIRST DEVICE

→ 86 COMMUNICATING THE HUMIDITY, AIRFLOW, TEMPERATURE, DEW POINT, DENSITY AND ENTHALPY TO A SECOND DEVICE VIA THE FIRST DEVICE

FIG. 7

0 CFM     76.1 F
61.8 F  DPT  61%RH

FIG. 8

0 CFM     76.1 F
31  Btu/1b  61%RH

FIG. 9

|  | Single Point | Using Avg. Temp | Using Vel Weight Temp |  |
|---|---|---|---|---|
|  |  |  | 128 | 108 | 105 |
|  |  |  | 1327.778 |
|  | 73 | 74.11 | 73 | 69 | 61 | 76.01 |
|  |  |  | 45 | 47 | 47 |
|  | 55 | 55 | 55 |
|  |  |  |  | ACTUAL |
|  | ###### | ###### | ###### |
|  | 26.11 | 26.39 | 26.85 |

| FPM | 2000 | 1800 | 1700 |
|     | 1300 | 1250 | 1100 |
|     | 900  | 950  | 950  |

| Temp F | 85 | 80 | 82 |
|        | 75 | 73 | 74 |
|        | 67 | 65 | 66 |

| Grains/lb | 55 | 55 | 55 |
|           | 55 | 55 | 55 |
|           | 55 | 55 | 55 |

RH >
ENTHALPY>

FIG. 16

AIRSTREAM SENSOR DEVICES, SYSTEMS AND METHODS

CROSS-REFERENCE TO RELATED APPLICATIONS

The present application is a continuation-in-part of U.S. patent application Ser. No. 16/035,183 which was filed on Jul. 13, 2018 and which claims priority to U.S. Patent Application Ser. No. 62/532,517 filed on Jul. 14, 2017, and claims priority to U.S. Provisional Patent Application Ser. No. 62/969,374 which was filed on Feb. 3, 2020. The entirety of the forgoing applications is incorporated herein by reference.

BACKGROUND

Statement of the Technical Field

The present document relates to sensor devices and systems. More particularly, the present document relates to sensor devices, implementing systems and methods for measuring parameters associated with an airstream passing through air conveyance structure (e.g., a duct, a plenum space, or other location in a heating, ventilating and air conditioning (HVAC) system).

DESCRIPTION OF THE RELATED ART

It is estimated that more than one third of current global energy consumption is used to maintain indoor environments, for example, via HVAC systems. Any improvements in the efficiency and control of HVAC systems have the potential to reduce the overall use of energy.

Manufacturers of HVAC systems and components seek ways to provide consumers with controlled, energy efficient systems without having to compromise the indoor air quality and/or the comfort of building occupants.

One area in which energy savings can be realized is by utilizing outside air to cool or heat the interior of a building or structure, which allows air conditioning compressor(s) and/or heating elements to be powered off. For example, some HVAC controls utilize data from temperature sensor devices to determine when to heat or cool an indoor space using outside air, by basing the decision on whether the temperature of the outside air is higher or lower than the temperature of the inside air. This type of determination can be problematic; however, as making decisions based on temperature alone may result in discomfort to building occupants when the outside air used to heat or cool the occupied space is too humid.

Accurately controlling outdoor air ventilation and exhaust airflows are necessary for building pressurization. It is the difference of these airflows (pressurization flow) that maintains the pressurization within a building or space. Proper building pressurization is needed to prevent unfiltered and unconditioned air from entering buildings. Negatively pressurized buildings or spaces can lead to health problems either by contaminates in the outdoor air or within the building envelope. Additionally, energy use may increase and comfort problems may arise if the outdoor air is not properly conditioned by the HVAC equipment. In humid climates, a significant amount of moisture can be brought into a building, potentially resulting in condensation, which may create conditions that facilitate cause mold growth.

When designing HVAC systems and calculating loads, engineers often use software incorporating psychrometric formulas. Verification of calculations and proper system operation can be quickly made in the field with constants based on standardized air conditions. However, as the density changes, these constants become invalidated.

Other HVAC controls utilize data transmitted from separate humidity and temperature sensor devices when making decisions on whether to cool an indoor space using outside air, which may result in inefficient use of equipment, physical space, and electrical controls. Furthermore, the data collected by the separate sensor devices may be inconsistent and/or skewed, since the locations positions of the separate devices throughout the HVAC system varies, and is not been optimized for accuracy and/or repeatability. Moreover, existing systems often collect data from humidity sensors mounted on duct walls, which may fail to capture data associated with the bulk of the airstream.

Generally, airflow, temperature, humidity, and dew point information is required to efficiently operate HVAC equipment. Enthalpy is calculated using temperature and humidity using the following mathematical equation (1).

$$H=(0.24 \times T)+[W \times (1061+0.444 \times T)] \tag{1}$$

where H=enthalpy (Btu/lb), T=dry-bulb temperature (°F), and W=specific humidity (lbwater/lbdry air).

Stand-alone sensors are ordinarily used to determine the airflow rate, temperature, and humidity measurements. Airflow measurement devices include single or multi-point airflow measurement devices, such as differential pressure pitot tubes or piezo rings, thermal airflow sensors or vortex shedding sensors. In some cases, thermal airflow sensors provide a temperature signal, since temperature measurement if required for the determination of the airflow rate. Temperature measurement is typically obtained using a single-point sensor (unless provided with a thermal airflow sensor) or using an averaging "serpentine" temperature sensor probe that has multiple temperature sensors in series. Humidity is typically measured using a single-point sensor.

Typical measurement technology is relatively bulky, requiring multiple sensors, redundant power connections, and redundant signal connections. Redundant signal connections are most troublesome when the devices use a network connection to a host building automation system (BAS) or application controller (AC), as disruptions in such network can potentially impact the ability to gain measurements. Additionally, temperature measurement accuracy may be limited in many HVAC applications using typical technology, as a result of velocity and temperature measurement profiles that cannot be addressed using modern temperature and humidity technologies, and thus, temperature measurement error can be significant. For example, measurement uncertainty from pure arithmetic averaging in an air stream may, in certain cases, be such as illustrated in Table A below. The actual temperature must be "weighted" for the variations in air velocity.

TABLE A

Weighted temperature is calculated as follows:
$\Sigma_i = 1$ to $n(V_i \times T_i)/n$
Where:
V = point velocity (FPM or SFPM)
T = point temperature (° F.)

Arithmetic vs. Weighted Temperature Example
Measurement Location: Mixed Air Stream

| Velocity Profile (FPM) | | | | Temperature Profile (° F.) | | | |
|---|---|---|---|---|---|---|---|
| 1646 | 1431 | 1418 | 1426 | 82.4 | 81.1 | 80.3 | 80.4 |
| 1184 | 1195 | 1217 | 1024 | 70.6 | 69.9 | 69.8 | 68.0 |

TABLE A-continued

Weighted temperature is calculated as follows:
$\Sigma_i = 1$ to $n(V_i \times T_i)/n$
Where:
V = point velocity (FPM or SFPM)
T = point temperature (° F.)

Arithmetic vs. Weighted Temperature Example
Measurement Location: Mixed Air Stream

| Velocity Profile (FPM) | | | | Temperature Profile (° F.) | | | |
|---|---|---|---|---|---|---|---|
| 783 | 561 | 685 | 788 | 60.3 | 59.9 | 60.1 | 61.9 |
| 519 | 445 | 358 | 460 | 49.8 | 49.9 | 51.0 | 49.7 |
| Arithmetic Average: | | | 65.3° F. | | | | |
| Weighted (true) Average: | | | 70.1° F. | | | | |
| Difference: | | | 4.8° F. | | | | |

Temperature measurement error may have a significant effect on enthalpy calculations, since the true average temperature is required to accurately determine enthalpy. Systems with an airside economizer (free cooling system) often require enthalpy measurements in order to properly switch to and from free cooling mode, i.e., the switchover point. Systems that use enthalpy switchover require enthalpy measurement in the following airstreams, depending on the switchover method selected.

Return and outdoor air stream
Mixed air stream (location where outdoor air and return air come together)
Outdoor airstream When enthalpy is measured in just one of these air streams, significant error can result from temperature measurement uncertainty. In most applications, enthalpy switchover is desired but is not ultimately used as a result of measurement error (which may sometimes be misdiagnosed as a limitation of the humidity sensor).

SUMMARY

The present disclosure concerns implementing systems and methods for measuring airstream parameters. In some scenarios, the methods comprise: measuring a humidity and a temperature by a plurality of sensors of at least one airstream sensor device arranged symmetrically within a single cross-sectional plane of an air flow conveyance structure of an HVAC system; measuring, by at least one absolute pressure sensor, a barometric pressure of an atmosphere outside of the air flow conveyance structure; receiving, by a transmitter, humidity measurement values and temperature measurement values from the plurality of sensors and at least one barometric pressure value from the at least one absolute pressure sensor; computing, by the transmitter, a velocity weighted temperature value for the airstream based on the temperature measurement values (where the velocity weighted temperature value accounts for variations in the airstream's velocity within the single cross-sectional plane at a plurality of different locations in the air flow conveyance structure); use at least the barometric pressure values to determine an elevation and an air density of a surrounding environment to correct airflow rate; using, by the transmitter, the humidity measurement values, the velocity weighted temperature value, and the barometric pressure value to determine a psychrometric property associated with the airstream; and causing, by the transmitter, operations of the HVAC system, a building automation system or an application controller to be controlled based on the determined psychrometric property and the corrected airflow rate.

In those or other scenarios, the methods comprise: symmetrically measuring, by an airstream sensor device, a thermal dispersion, a humidity and a temperature of an airstream in a single cross-sectional plane of an air flow conveyance structure of an HVAC system; receiving, at a transmitter, a plurality of electrical signals that are generated by the airstream sensor device and that comprise thermal dispersion airflow measurement values, humidity measurement values and temperature measurement values; receiving, by a transmitter, at least one barometric pressure value from at least one absolute pressure sensor; computing, by the transmitter, airflow velocity values based on the thermal dispersion airflow measurement values; computing, by the transmitter, a velocity weighted temperature value for the airstream based on the airflow velocity values and the temperature measurement value (wherein the velocity weighted temperature value accounts for variations in the airstream's velocity within the single cross-sectional plane); using, by the transmitter, the humidity measurement values, the velocity weighted temperature value, velocity measured values, and/or the barometric pressure value to determine a psychrometric property associated with the airstream and to correct calculated airflow volumetric rate (e.g., when the density is different than standard conditions); causing, by the transmitter, operations of the HVAC system, a building automation system or an application controller to be controlled based on the determined psychrometric property; and/or displaying the airflow velocity values, the velocity weighted temperature value, the dew point, density, and the psychrometric property on a display screen of the transmitter. The airstream sensor device may be disposed in a supply airstream, a return airstream, an outside airstream, or any other air flow conveyance structure of an HVAC system.

In those or other scenarios, the corrected airflow rate equates to mass flow rate. The mass flow rate is used to determine an amount of heat transfer of a heat exchanger in the HVAC system. The amount of heat transfer is used to optimize performance of the HVAC system.

The implementing systems of the above described methods can include, but are not limited to, a processor and a non-transitory computer-readable storage medium comprising programming instructions that are configured to cause the processor to implement the above described methods.

In some scenarios, the implementing systems comprise airstream sensor device(s) configured to be disposed in an air flow conveyance structure of an HVAC system. The air stream sensor device(s) can include, but are not limited to, a probe, a pilot tube, a damper, a flow capture hood, a thermal meter, a vortex shedder, or a measuring louver. The airstream sensor(s) comprise(s): a housing comprising an elongate hollow shaft configured to extend between a first inner wall of the air flow conveyance structure and an opposing second inner wall of the air flow conveyance structure; a plurality of openings formed in the elongate hollow shaft so as to be spaced apart along the elongate length of the housing; and a plurality of sensors (e.g., a bead-in-glass thermistor) respectively disposed in the plurality of openings formed in the elongate hollow shaft of the housing, and configured to measure a temperature, an airflow, and a relative humidity of an airstream within a single cross-sectional plane of the air flow conveyance structure. The systems also comprise: at least one absolute pressure sensor configured to measure a barometric pressure of an atmosphere outside of the air flow conveyance structure; and a transmitter communicatively coupled to the at least one airstream sensor device and the absolute pressure sensor. The transmitter is configured to: receive humidity measured values and temperature measured values from the at least one airstream sensor device and barometric pressure values from the at least one absolute pressure sensor; compute a velocity weighted temperature value for the airstream based on the temperature measured values, wherein the velocity weighted temperature value accounts for variations in the airstream's velocity within the single cross-sectional plane at a plurality of different locations in the air flow conveyance structure; use the humidity measured values, the velocity weighted temperature value, the velocity weighted humidity value, and/or the barometric pressure values to determine a psychrometric property associated with the airstream and to correct calculated airflow volumetric rate (e.g., when the density is different than standardized conditions); and cause operations of the HVAC system to be controlled based on the determined psychrometric property (e.g., an enthalpy value, a dew point value, and/or a density) and corrected airflow volumetric rate. For example, at least one parameter of the HVAC system is adjusted based on the determined psychrometric property In some scenarios, the absolute pressure sensor(s) is(are) in operative communication with a geolocation device. The geolocation device can include, but is not limited to, at least one of a global positioning satellite (GPS) receiver, an internet protocol (IP) address, and a lookup table.

In those or other scenarios, at least one first airstream sensor device is disposed upstream in the airstream of a heat transfer portion of the HVAC system, and at least one second airstream sensor is disposed downstream in the airstream of the heat transfer portion of the HVAC system, thereby determining the energy inputted or removed. The first and/or second airstream sensor device is(are) configured to, in cooperation with the transmitter, determine at least one performance characteristic of the heat transfer portion of the HVAC system.

In those other scenarios, at least one first airstream sensor device is disposed upstream in the airstream of the HVAC system, and at least one second airstream sensor is disposed in a second airstream converging and mixing with the airstream of the HVAC system of the heat transfer portion of the HVAC system. The first and/or second airstream sensor device(s) is(are) configured to, in cooperation with the transmitter, to determine the energy balance of mixture processes of the airstream of the HVAC system and the second airstream.

In those or other scenarios, the transmitter is further configured to: communicate at least one of the humidity measured values, the temperature measured values, the velocity weighted temperature value, the barometric pressure, density, dew point, and the enthalpy value to an external device; compute a velocity weighted humidity value and a velocity weighted enthalpy value for the airstream based on the humidity measured values; and/or receive airflow measured values from airstream sensor devices including the at least one airstream sensor device, and determine at least two airflow velocity values based on the airflow measured values. At least two airflow velocity values may be used to compute the velocity weighted temperature value in addition to the temperature measured values.

In those or other scenarios, the airstream sensor device comprises a relative humidity sensor that is disposed proximate a center point of the housing. The airstream sensor device may comprise multiple relative humidity sensors. The housing may be an elongated probe housing comprising a first end and a second end. The sensors of the airstream sensor device may be spaced apart at equal distances between the first end and the second end.

BRIEF DESCRIPTION OF THE DRAWINGS

The present solution will be described with reference to the following drawing figures, in which like numerals represent like items throughout the figures.

FIG. 6 provides a block diagram of an exemplary method of measuring airstream parameters using an airstream sensor device.

FIG. 7 provides a block diagram of an exemplary method of monitoring airstream parameters using an airstream sensor device.

FIG. 8 provides a schematic representation of a graphical display of an airstream sensor device and system.

FIG. 9 provides a schematic representation of a graphical display of an airstream sensor device and system.

FIGS. 14-16 provide illustrations that are useful for understanding a velocity-weighed enthalpy.

DETAILED DESCRIPTION

Figure 1:
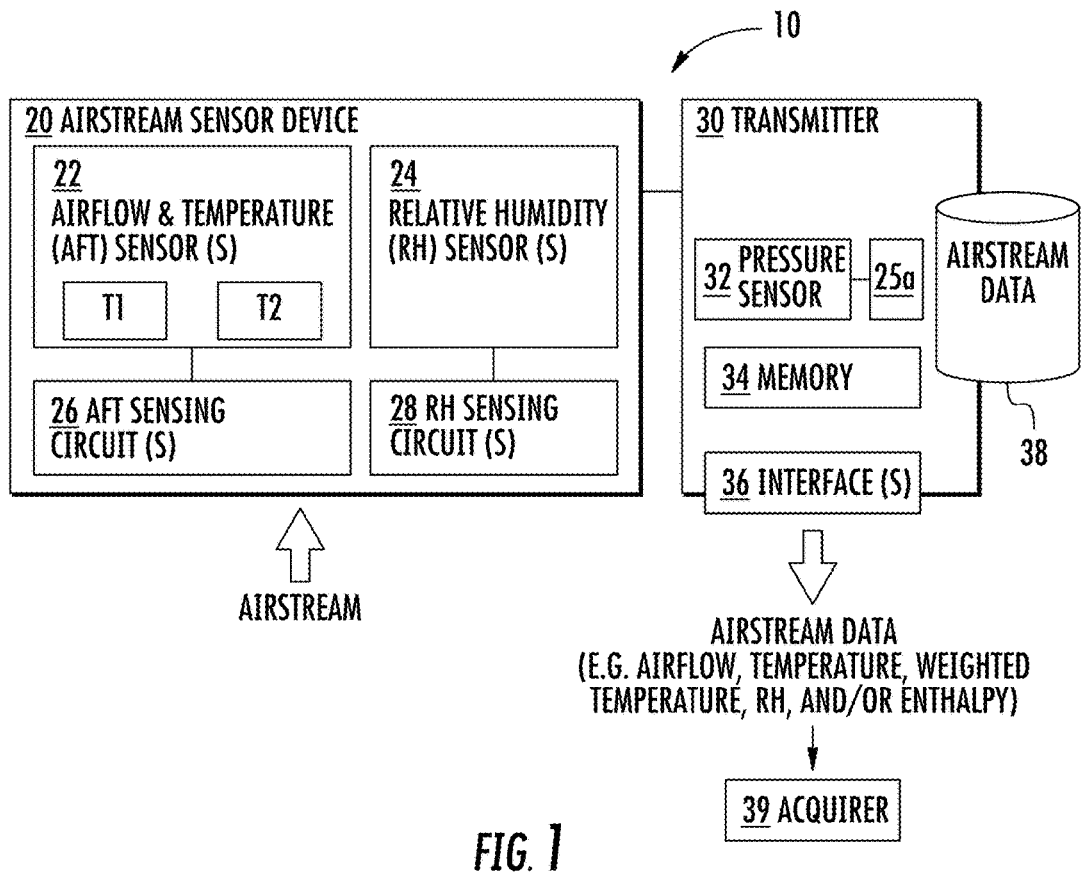
FIG. 1 is a block diagram of an illustrative airstream sensor device and system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "transmitter" refers to a physical computing device including one or more processors and memory. The transmitter can utilize software in combination with hardware and/or firmware for implementing various features and/or performing various aspects of the airstream sensor devices and/or systems described herein.

The terms "resistance sensor" and "resistor sensor" refer to a sensor in which the resistance increases or decreases in response to changes in temperature. The change in resistance can be measured via a resistance sensing circuit in which the resistance sensor is disposed, connected, and/or in electrical communication with. Similarly, the terms "capacitance sensor" or "capacitor sensor" refer to a sensor in which the capacitance increases or decreases in response to changes in the surrounding moisture level or humidity. The changes in capacitance can be measured via a capacitance sensing circuit in which the capacitance sensor is disposed, connected, and/or in electrical communication with.

Relative terms such as "below" or "above" or "upper" or "lower" or "horizontal" or "vertical" may be used herein to describe a relationship of one element, feature, member, or component to another element, feature, member, or component as illustrated in the figures. It is understood that these terms are intended to encompass different orientations of the device in addition to the orientation depicted in the figures. Like numbers refer to like elements in the figures.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The present document concerns airstream devices, implementing systems and methods are which address limitations of conventional systems such as those discussed above. A need exists for improved airstream sensor devices, systems, and methods having a single point of control and employing multiple, different types of sensors for collecting multiple data points at various locations in an airstream. Such devices, systems, and methods can employ a combination of one or more temperature sensors, humidity sensors, and/or thermal dispersion airflow sensors for assuring that minimum ventilation requirements are met. A need also exists for improved airstream devices, systems, and related methods that incorporate correction factors on a real time basis using barometric pressure, airflow, temperature to make automatic calculations without the need for correction factors, eliminating potential errors, and potentially enhancing performance and/or efficiencies.

In the present solution, airflow measurement technology, temperature measurement technology, pressure sensor technology, and humidity measurement technology are combined into a single package, thus simplifying installation and wiring. The value of enthalpy is an important psychrometric entity, because when it is combined with mass flow, the total heat energy transferred can be determined. Thereby the power of an energy exchanger such as a cooling coil or energy wheel can be determined when the before and after (AH) conditions are known, and knowing the relative humidity and ambient barometric pressure for the geographic location, the specific humidity (humidity ratio) may be calculated, which allows for enthalpy to be determined. Enthalpy measurement is required for many air handling units (AHU) that use one or more airside economizers (known as "free cooling") to determine the switchover point from substantially total mechanical cooling to a modulating economizer mode.

The barometric pressure sensing technology employed by the present solution is different than the differential pressure sensor technology used in conventional systems. The differential pressure measured in the conventional systems is different than the barometric pressure of a surrounding environment. In this regard, it should be understood that the differential pressure is a difference of two pressure measurements in the conveyance structure made at a same time. In contrast, the barometric pressure is an atmospheric pressure measured outside of the airflow conveyance structure at a given point time. The barometric pressure is advantageously used in the present solution to determine a density of a surrounding atmosphere and calculate a mass air flow. The mass air flow is then used to determine an amount of heat transfer of a heat exchanger in the HVAC system. The determined amount of heat transfer is then used to optimize performance of HVAC system. For example, the amount of outside air being passed to an interior are of a building to dilute an indoor environment is accurately and optimally controlled based on the mass air flow calculation. Dilution of the indoor environment can result in the removal of contaminants from inside the building. Additionally or alternatively, a temperature parameter of an area can be more efficiently or effectively reached based on the mass air flow calculation to reduce an amount of time it takes to heat/cool an indoor area as compared to that of conventional systems which do not consider the density of a surrounding atmosphere.

Generally, airflow, temperature, humidity, and dew point information is required to efficiently operate HVAC equipment. The value of enthalpy is an important psychrometric entity, because when it is combined with mass flow, the total heat energy transferred can be determined. Thereby the power of an energy exchanger such as a cooling coil or energy wheel can be determined when the before and after (AH) conditions are known, and knowing the relative humidity and barometric pressure, the specific humidity (humidity ratio) may be calculated, which allows for enthalpy to be determined. More specifically, the provision of a temperature, and humidity sensor, together with a barometric sensor allows for automatic calculation of density, and also, for specific psychometric calculations to be automatically adjusted.

Implementations of the present disclosure comprise airstream devices, implementing systems and methods that include automatically implementing the measuring of the barometric pressure at an altitude using logic system without user interface. Additionally, implementations of the present disclosure comprise airstream devices, implementing systems and methods that include automatically implementing the measuring of the barometric pressure at an altitude using a geolocation determination by global positioning satellite (GPS) receiver, internet protocol (IP) address, and/or a lookup table. Upon the barometric pressure at elevation being measured, the altitude value can be determined using the following mathematical equation (2).

$$h = \frac{\left(\left(\frac{P_0}{P}\right)^{\frac{1}{5.257}} - 1\right) \times (T)}{0.0065} \quad (2)$$

where h=altitude above sea level (m), $P_0$=pressure at sea level (mbar), P=pressure reading at elevation (mbar), and T=temperature at elevation (° K).

If real time barometric pressure, airflow and temperature are available, then automatic calculations could be made without the need for correction factors, thereby potentially eliminating potential errors. Thus, the present solution can comprise: an airstream sensor integrated with a transmitter including one or more onboard barometric or absolute pressure sensors that enable the determination of various combinations or psychrometric calculations for use as operating information and/or as control parameters for HVAC systems; multiple airstream sensors integrated with a transmitter including an onboard absolute pressure sensor that, upon being placed in two or more sets in a single airstream on either side of a heat transfer device (such as a heat exchanger) enables the performance of the heat transfer device to be measured, i.e., the airstream sensor working in concert act as a heat transfer device energy meter; and/or multiple airstream sensors integrated with a transmitter including an onboard absolute pressure sensor that, upon being placed in two or more sets in converging airstreams are capable of determining the energy balance of mixture processes of such converging airstreams.

The present solution is an improvement over existing devices, as multiple, different types of airstream measurement sensor devices (including temperature sensors, thermal dispersion airflow sensors, pressure sensors, and relative humidity sensors) can be co-located in a single device for improved multi-point airstream sampling, air density, and psychrometric calculations. The different types of airstream measurement sensors can be positioned in co-planar locations spanning a width, length, and/or height a plenum space or duct for more consistent air sampling and averaging. Notably, the devices, systems, and methods herein comprise multiple point thermal dispersion airflow, temperature, and humidity sensors in single airflow measurement device, including but not limited to a probe.

In some scenarios, the present solution include a system comprising a thermal airflow measurement sensor and a temperature sensor, wherein the system is used to determine the airflow rate of the thermal measurement device and is used with a humidity sensor and pressure sensor to determine air density and psychrometric calculations. In those or other scenarios, the present solution includes a system comprising a thermal airflow measurement sensor and a temperature sensor, which uses airstream humidity measurement values, airstream velocity weighted temperature value, and barometric pressure to determine a psychrometric property associated with the airstream, such as an enthalpy value, a dew point value and/or a density value. In those or other scenarios, the present solution includes a system comprising an absolute pressure sensor that detects and output barometric pressure for use in determining a psychrometric property associated with an airstream, such as an enthalpy value, a dew point value and/or a density value, wherein the absolute pressure sensor is in operative communication with a geolocation device including at least one of a global positioning satellite (GPS) receiver, an internet protocol (IP) address, and a lookup table.

In those or other scenarios, the present solution includes thermistors to determine the airflow rate and temperature of a thermal airflow measurement device, a pressure sensor, and any of a number of types of humidity sensor, and a further implementation includes a thermal airflow measurement device and a specific humidity sensor such as sold by EBTRON, INC. of Loris, South Carolina USA. In those or other scenarios, the present solution uses multi-point airflow and measurement device to determine the airflow and temperature of multiple points in an array, spaced either for equal area distribution or any other distribution to determine the velocity-weighted temperature, a pressure sensor, and any of a number of types of humidity sensor. This allows the use of velocity weighted temperature to determine air density and psychrometric calculations. Additionally or alternatively, the present solution uses an array of temperature sensors to improve the humidity measurement using velocity-weighted humidity. Alternatively, adding humidity sensors can increase accuracy in humidity measurement when airstreams are not well mixed or converging airstreams of different humidity ratios exist.

In those or other scenarios, multiple humidity sensors are co-located on a single device with one or more temperature and thermal dispersion airflow sensors, which improves the accuracy and performance of the sensor devices and systems. The data from the co-located temperature and humidity sensors is used to estimate the enthalpy of the airstream. A transmitter can transmit the airflow, temperature, humidity, and psychrometric data to an acquiring source (e.g., a controller, a reader, a server, a building management system, etc.) for making decisions.

Further, the present solution can involve electrically communicating data from multiple sensors to a single processing point that receives the sensor data, processes the sensor data, and transmits various airstream parameters calculated using the sensor data to various acquiring entities that implement HVAC control, monitoring, and/or management. The airstream parameters can include, but are not limited to, airstream airflow, temperature, relative humidity, dew point, air density, and/or enthalpy used for HVAC control, monitoring, and/or management. By virtue of the versatile mounting options associated with the devices and systems described herein, the sensor devices and respective sensors can be placed in challenging field locations for obtaining consistent measurements of the airstreams in such locations.

Further implementations of the present solution can measure and transmit individual data for various discrete multi-point sensors or a true average of the multi-point sensors. Implementations of the devices herein may utilize high quality, stable, and durable sensor technology, not limited to hermetically sealed "bead-in-glass" thermistors for measuring temperature and airflow. The thermistors are factory calibrated and be less subject to drift. Without having to perform periodic field calibration, maintenance and labor costs can be reduced and operational consistency enhanced. Direct measurement is generally a more stable method of control and reduces wear and stress on other components.

Adding humidity and pressure measurement to an airflow station or measurement device facilitates the airflow, temperature, humidity and calculation of density, dew point, and enthalpy to be obtained or processed and transmitted by a single device. The airflow, temperature, humidity and calculation of density, dew point, and enthalpy may be transmitted from a first device (e.g., a processing device) to a second device. Data from multiple devices can be used to determine the power of heat transfer energy of heat exchangers to the airstream or air mixtures. The temperature measurement obtained from the airflow station or measurement device may be individual temperature for one or more points in an airstream, an average temperature of multiple points in an airstream, or velocity-weighted temperature. Velocity-weighted temperature takes into account the velocity at the temperature measurement point compared to the others so that the temperature measurement can be weighted by the flow amount.

In some scenarios, an airstream sensor device is provided. The airstream sensor device comprises a housing and a plurality of sensors disposed on the housing. The plurality of sensors comprise at least one temperature sensor, at least one thermal dispersion airflow sensor, and at least one relative humidity sensor configured to detect the respective temperature, airflow, and relative humidity of an airstream. More than one relative humidity sensor may be disposed over the housing, and the sensors form a sensor array. The plurality of sensors detect electrical signals that are associated with and that can be correlated to airstream parameters, including the airstream temperature, airflow velocity, relative humidity, dew point, and enthalpy.

The housing may be elongated and have first end and second ends. The first and second ends can be mounted to surfaces of a duct or a plenum space in an HVAC system. The parameters obtained via the devices described herein can be used to implement HVAC system control, management, or monitoring.

The temperature and thermal dispersion airflow sensors may form a pair of thermistors comprising first and second thermistors. The first thermistor is configured to measure changes in resistance associated with the airstream temperature. The second thermistor may be heated to a temperature above the airstream temperature for measuring changes in resistance associated with the airstream airflow.

The relative humidity sensor can comprise a resistance or capacitive sensor configured to detect humidity. The sensor can comprise a polymeric humidity-sensing film in some instances. More than one relative humidity sensor can be disposed in a single sensor device. One or more relative humidity sensors can optionally be disposed proximate a center point of the housing. Additionally, one or more relative humidity sensors can be optionally disposed proximate the first or second ends of the housing. The sensors can be spaced apart at equal or unequal distances between the first and second ends of the housing.

In some scenarios, an airstream sensing system is provided. The system comprises an airstream sensor device and a transmitter. The transmitter is in electrical communication with the device, and is configured to receive and process electrical signals communicated by the device. The transmitter contains an absolute pressure sensor used to determine changes in barometric pressure or altitude. The transmitter can output a calculated temperature, a calculated airflow velocity, a relative humidity value, a calculated enthalpy of the airstream, a calculated dew point, and/or combinations thereof. The calculated values can be transmitted simultaneously or not.

The plurality of sensors comprise at least one pair of thermistors configured to change resistance in response to an airstream passing over the device and at least one relative humidity sensor configured to change capacitance in response to the airstream passing over the device. The system further comprises a transmitter electrically connected to the airstream sensor device. The transmitter is configured to calculate a psychrometric properties of the airstream using a signal indicative of the change in resistance of the thermistors and a signal indicative of the change in capacitance of the relative humidity sensor, and an absolute pressure sensor. The transmitter and airstream device can be integrally formed as a single assembly, or the transmitter can be remotely disposed relative to the airstream device in an HVAC system.

In certain scenarios, the transmitter receives signals from a plurality of airstream sensor devices. The airstream sensor devices can in certain implementations comprise a length of between 0.6 inches and 16 feet. The airstream sensor devices can comprise between three and sixteen sensors. Multiple pairs of thermistors and multiple relative humidity sensors can be provided on or over a single airstream sensor device. The airstream sensor devices can be positioned in an HVAC system, for example, being located in one or more ducts, plenum spaces, or any other location in an HVAC system not inconsistent with the subject matter herein.

In further aspects, an illustrative method of measuring airstream parameters is disclosed. The method comprises receiving, at a transmitter, a plurality of electrical signals from an airstream sensor device positioned in an airstream. The electrical signals are indicative of a temperature, a thermal dispersion airflow, and a relative humidity of the airstream. The method can further comprise processing the electrical signals to obtain a calculated temperature, a calculated airflow, dew point, and an enthalpy of the airstream and transmitting the calculated temperature, the calculated airflow, the calculated dew point, and the enthalpy to an acquirer. The method can further comprise displaying the temperature, airflow, dew point, and enthalpy values on a display screen of the transmitter.

The present solution can be implemented in software in combination with hardware and/or firmware. For example, the present solution can be implemented in software executed by a processor. In one exemplary implementation, the subject matter described herein can be implemented using a non-transitory computer readable medium having stored thereon computer executable instructions, that when executed by the processor of a computer, control the computer to perform steps. Computer readable media suitable for implementing the subject matter described herein can include, but is not limited to, non-transitory computer-readable media, such as disk memory devices, chip memory devices, programmable logic devices, and application specific integrated circuits. In addition, a computer readable medium that implements the present solution may be located on a single device or the computing platform or may be distributed across multiple devices or computing platforms.

Referring now to FIG. 1, there is provided a block diagram of an airstream sensor system 10. Briefly, the airstream sensor system 10 comprises, consists, and/or consists essentially of at least one airstream sensor device 20 and at least one transmitter 30.

Pursuant to the present disclosure, a humidity sensor is combined with an air flow measurement device (e.g., a thermal probe) in a single, integrated device. This allow for simplified enthalpy measurement and velocity and/or air flow mass flow rate measurements by locating air flow, temperature and humidity substantially at the same location or locations within and air flow. Such can be particularly useful in relatively large cross-sectional flow environments, since in such environments, there can be variations in temperature, humidity, and the proportion of air, or mass flow, rates across the air flow profile. Thus, when attempting to measure humidity or enthalpy, taking a single point measurement of temperature, or a multiple point average of temperature, does not truly accurately the average temperature of such air flow. Positioning of multiple such devices of the present disclosure can alleviate this problem and allow for velocity-weighted mass flow, temperature, humidity, and enthalpy measurements to be accurately taken. Velocity-weighted temperature and humidity is desirable, since accurate velocity-weighted temperature and velocity-weighted humidity measurements facilitate a more accurate estimate of enthalpies. A device of the present disclosure thus allows for the generation of velocity-weighted temperature profiles, humidity profiles, mass flow rate profiles, and enthalpy profiles across an air flow.

In the present solution, a measured relative humidity value is used to calculate a humidity ratio and a dew point. Since relative humidity is dependent on temperature, it is important to have not only accurate temperature measurement (e.g., via a bead in glass sensor) but also to take the temperature measurement close to relative humidity measurement value (within same cross-sectional plane). Additionally, a humidity ratio and barometric pressure is used to calculate enthalpy. A velocity weighted temperature is used to calculated velocity weighted enthalpy and a velocity weighted relative humidity.

The barometric pressure and measured velocity is used to calculate actual volumetric airflow (ACFM). Accuracy of a sensor is based on wind tunnel calibration at standardized conditions. When density changes, the measured value needs to be corrected to bring it back to standard airflow. Previously this type of correction could be made by entering a correction value or elevation value into the system. When corrections are not incorporated, the measured airflow is incorrect and operation of HVAC system is incorrect. By adding barometric sensing, an automatic correction is provided for any elevation change. That could be on a mountain or in a skyscraper. The following tables show illustrative elevation atmospheric pressure, density and airflow in a plurality of geographic locations.

| Elevation Atmospheric Pressure | | | | | |
|---|---|---|---|---|---|
| Altitude (ft) | Pressure (psia) | Density (lbm/ft) | World City | State/ Country | Population (000,000) |
| Sea Level | 14,696 | 0.075 | | | |
| 750 | 14.302 | 0.073 | Charlotte | NC | 872 |
| 1500 | 13.917 | 0.071 | Munich | DE | 1,475 |
| 2250 | 13.540 | 0.069 | Edmonton | AB | 981 |
| 3000 | 13.171 | 0.067 | Billings | MT | 110 |
| 3750 | 12.811 | 0.065 | El Paso | TX | 683 |
| 4500 | 12.458 | 0.064 | Reno | NV | 249 |
| 5250 | 12.114 | 0.062 | Denver | CO | 716 |
| 6000 | 11.777 | 0.060 | Colo Sprgs | CO | 465 |
| 6750 | 11.448 | 0.058 | Loja | EC | 180 |
| 7350 | 11.190 | 0.057 | Mexico City | MX | 8,851 |
| 8250 | 10.812 | 0.055 | Addis Ababa | ET | 4,793 |
| 8500 | 10.709 | 0.055 | Bogota | CO | 8,080 |
| 9350 | 10.364 | 0.053 | Quinto | EC | 2,239 |
| 10000 | 10.107 | 0.052 | Huancayo | PE | 425 |
| 11250 | 9.626 | 0.049 | Cusco | PE | 358 |
| 12000 | 9.346 | 0.048 | La Paz | BO | 845 |
| 13600 | 8.772 | 0.045 | El Alto | BO | 1,185 |

| Elevation Atmospheric Pressure | | | | | |
|---|---|---|---|---|---|
| Altitude (ft) | Pressure (psia) | Airflow (acfm) | World City | State/ Country | Population (000,000) |
| Sea Level | 14,696 | 100 | | | |
| 750 | 14.302 | 97 | Charlotte | NC | 872 |
| 1500 | 13.917 | 95 | Munich | DE | 1,475 |
| 2250 | 13.540 | 92 | Edmonton | AB | 981 |
| 3000 | 13.171 | 90 | Billings | MT | 110 |
| 3750 | 12.811 | 84 | El Paso | TX | 683 |
| 4500 | 12.458 | 85 | Reno | NV | 249 |
| 5250 | 12.114 | 82 | Denver | CO | 716 |
| 6000 | 11.7477 | 80 | Colo Sprgs | CO | 465 |
| 6750 | 11.448 | 78 | Loja | EC | 180 |
| 7350 | 11.190 | 76 | Mexico City | MX | 8,851 |
| 8250 | 10.812 | 74 | Addis Ababa | ET | 4,793 |
| 8500 | 10.709 | 73 | Bogota | CO | 8,080 |
| 9350 | 10.364 | 71 | Quinto | EC | 2,239 |
| 10000 | 10.107 | 69 | Huancayo | PE | 425 |
| 11250 | 9.626 | 66 | Cusco | PE | 358 |
| 12000 | 9.346 | 64 | La Paz | BO | 845 |
| 13600 | 8.772 | 60 | El Alto | BO | 1,185 |

The following TABLE shows an impact on relative humidity by an accurate temperature measurement and an impact of elevation or weather change in enthalpy.

| Description | Barometric Pressure (in Hg) | Atmospheric Pressure (psai) | Dry Bulb (° F.) | Wet Bulb (° F.) | Relative Humidity (%) | Humidity Ratio (gr/lb) | Specific Volume (cu. ft/lb) | Enthalpy (Btu/lb) | Dew Point (° F.) |
|---|---|---|---|---|---|---|---|---|---|
| Base condition | 29.92 | 14.696 | 75 | 63.0 | 51.6 | 67.071 | 13.681 | 28.485 | 56 |
| −1° F. same HR | 29.92 | 14.696 | 74 | 62.7 | 53.4 | 67.071 | 13.656 | 28.241 | 56 |
| +1° F. same HR | 29.92 | 14.696 | 76 | 63.3 | 49.9 | 67.071 | 13.707 | 28.729 | 56 |
| Low Pres Rainy Day | 29.40 | 14.44 | 75 | 62.9 | 51.6 | 68.258 | 13.928 | 28.673 | 56 |
| Hi Pres Rainy Day | 30.20 | 14.833 | 75 | 63.0 | 51.6 | 66.422 | 13.553 | 28.383 | 56 |
| 1000 ft Elv | 28.86 | 14.173 | 75 | 62.8 | 51.6 | 69.566 | 14.195 | 28.879 | 56 |
| 2500 ft Elv | 27.32 | 13.416 | 75 | 62.6 | 51.6 | 73.555 | 15.009 | 29.509 | 56 |
| 5000 ft Elv | 24.90 | 12.228 | 75 | 62.2 | 51.6 | 80.835 | 16.494 | 30.657 | 56 |

Air flows do not generally mix uniformly, meaning, the temperatures and humidities at differing positions across the air flow vary one from another as a consequence of differences in mass flow rates across the air flow, which results in different enthalpies at differing positions across the air flow. Accordingly, a single point measurements or arithmetic averages of measurements of humidity are not adequate for determining, for example, the enthalpy of such air flow. Instead, velocity (and/or mass flow), temperature, and humidity measurements should thus be taken together, simultaneously at substantially the same location in order to obtain accurate velocity-weighted enthalpy measurements for the air flow.

The devices of the present disclosure, due to the humidity sensor being collocated with the temperature/flow sensor, allow for such simultaneous measurements at substantially the same location and thus allow for obtaining accurate enthalpy measurements for the air flow.

The sensor device 20 can comprise, for example, a portable airstream measuring instrument or a semi-permanently or permanently mounted airstream measuring instrument. The sensor devices 20 can include, but are not limited to, devices having a combination of different sensors disposed thereon for collecting and/or measuring different data associated with an airstream. Such sensor devices 20 may include, but are not limited to, handheld probes, handheld tubes, pitot arrays, mounted probes, combination damper/AFMS piezo rings, pitot-static tubes, pitot-static grids, flow capture hoods, multi-point duct averaging tubes or probes, single-point thermal meters, vortex shedders, measuring dampers, measuring stations, measuring louvers, or any other airstream/airflow measuring device not inconsistent with the instant disclosure. The transmitter 30 can comprise an integrated or remote physical hardware component that electrically communicates with the one or more devices 20 for receiving, processing, and communicating the data obtained therefrom.

The airstream sensor device 20 can further define a sensor support or housing configured to support or house a plurality of different types of sensors configured to measure and obtain different types of data, such as, temperature, airflow, and relative humidity data. In some scenarios, a single sensor device 20 can comprise a plurality of sensors disposed on, over, or in the housing thereof, the plurality of sensors can comprise at least one temperature sensor, at least one thermal dispersion airflow sensor, and at least one relative humidity (RH) sensor 24 that measure the respective airstream temperature, airflow and relative humidity. The temperature and airflow sensors are collectively labeled 22, as the temperature and airflow sensors are configured as a pair of thermistors including at least a first thermistor T1 and a second thermistor T2. The first thermistor T1 is a temperature sensor used to measure the temperature or an airstream. The second thermistor T2 is heated to a known temperature and used to measure the airflow via thermal dispersion techniques, whereby changes in resistance and temperature of the thermistor are correlated to the rate of airflow or velocity of an airstream. The thermal dispersion airflow sensors and temperature sensors are collectively referred to as airflow and temperature (AFT) sensors 22. The addition of one or more RH sensors 24 to a device having AFT sensors 22 improves the consistency of the airstream measurements being obtained, which in turn improves the calculated value for temperature, enthalpy, and airflow. Thus, the system 10 can provide more efficient control of airstreams in an HVAC system.

In certain scenarios, the AFT sensors 22 include at least one pair of thermistors. For example, the AFT sensors 22 can comprise one or more pairs of bead-in-glass thermistors that exhibit changes in resistance in response to an airstream passing over the device 20. The one or more RH sensors 24 are configured to exhibit changes in resistance, capacitance, or conductivity in response to the airstream passing over the device 20. Any type of RH sensor 24 not inconsistent with the instant disclosure can be disposed in the devices and systems described herein, including, for example, capacitive humidity sensors, resistive humidity sensors, or thermal conductivity humidity sensors.

Further, the devices 20 described herein can comprise an array of one or more AFT sensors 22 and at least one RH sensor 24 for estimating two or more of the temperature, thermal dispersion airflow, relative humidity, and enthalpy of an airstream. In further scenarios, the devices 20 described herein can comprise an array of one or more AFT sensors 22 and at least one RH sensor 24 for estimating three or more of the temperature, thermal dispersion airflow, relative humidity, dew point, and enthalpy of an airstream. In those or other scenarios, the devices 20 described herein can comprise an array of one or more AFT sensors 22 and at least one RH sensor 24 for estimating all four of the temperature, thermal dispersion airflow, relative humidity, dew point, and enthalpy of an airstream.

More than one AFT sensor 22 and/or pair of AFT sensors may be provided per device, more than two AFT sensors 22 and/or pairs of AFT sensors may be provided per device, more than three AFT sensors 22 and/or pairs of AFT sensors may be provided per device, or less than ten AFT sensors 22 and/or pairs of AFT sensors may be provided per device. Similarly, more than one RH sensor 24 may be provided per device, more than two RH sensors 24 may be provided per device, more than three RH sensors 24 may be provided per device, or less than ten RH sensors 24 may be provided per device. Any combination of different types and quantities of RH sensors 24 and AFT sensors 22 or pairs of AFT sensors not inconsistent with the instant disclosure can be provided per device 20.

Still referring to FIG. 1, and in some instances, the transmitter 30 is electrically connected to the airstream sensor device 20, and can obtain and calculate data including the temperature, airflow, relative humidity, dew point, and/or enthalpy of the airstream using data received from the combined AFT sensors 22 and RH sensor(s) 24. Previous iterations relied on input of elevation to determine equivalent barometric pressure in order to perform psychrometric calculations. The addition of an absolute pressure sensor 25 to transmitter 30 allows for automatic density and psychrometric calculations. Pressure sensor 25 is, in an exemplary implementation, capable of determining a geolocation by use of a geolocation device 25a (which could be within, separate, or remote from transmitter 30), such as a global positioning satellite (GPS) receiver, internet protocol (IP) address, and/or a lookup table, with pressure sensor 25 being in operative communication with one or more of such GPS receiver, IP address and lookup table.

The temperature, airflow, relative humidity, dew point, or enthalpy of the airstream can be obtained and calculated for individual points in the airstream or averaged over multiple points in the airstream. Such data can be communicated to an acquiring source or destination (i.e., technician, building manager, building automation system, controller, etc.) and used for troubleshooting the system, assessing air quality or ventilation, or making decisions to heat or cool a space via outside air based on the obtained data, among other uses. In certain scenarios, the temperature and airflow can be obtained and calculated, for example, from signals indicative of changes in resistance for AFT sensors 22 (e.g., in the pair of thermistors) and the enthalpy of the airstream can be calculated, for example, from signals indicative of the change in resistance of the AFT sensors 22 and signals indicative of the change in resistance or capacitance of the RH sensor 24.

Figure 2:
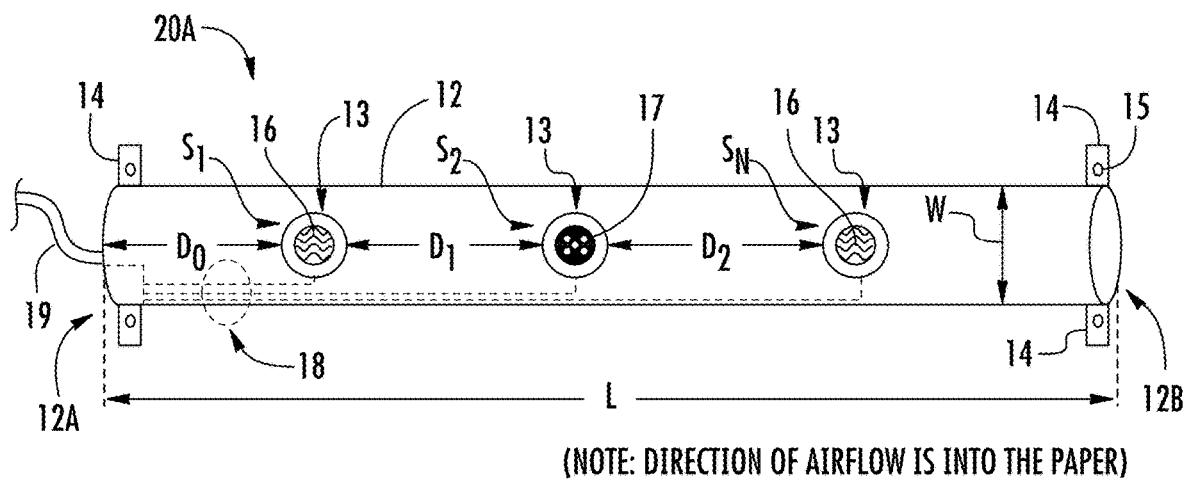
FIG. 2 is a schematic illustration of an airstream sensor device.

In further instances, the device 20 and transmitter 30 communicate directly with each other, for example, via a wired communication link (e.g., cable 19, FIG. 2). For example, system 10 can comprise a "plug and play" system whereby multiple airflow sensor devices 20 can be plugged into transmitter 30 so that data can be easily acquired therefrom and sent to other entities for HVAC management and control. Alternatively, wireless communications may be used between device(s) 20 and transmitter 30, where desired. Notably, the transmitter 30 is fully independent of the sensor devices 20 and does not require field matching. Further, a single transmitter 30 can transmit the airflow, temperature, humidity, dew point, or enthalpy data (individual data points or averaged over multiple data points) to the acquiring source for further manipulation, troubleshooting, and/or making HVAC decisions in a building or structure. The transmitter 30 can also display these values on graphical user interfaces, or displays, 30a, 30b, as indicated in FIGS. 8 and 9, respectively. More specifically, FIG. 8 is a schematic representation of example graphical display 30a with an example hypothetical dew point reading of 61.8° F. for an example hypothetical airflow having a temperature of 76.1° F. and 61 percent relative humidity. Similarly, FIG. 9 is a schematic representation of example graphical display 30b with an example hypothetical enthalpy reading of 31 BTUs per pound for an example hypothetical airflow having a temperature of 76.1° F. and 61 percent relative humidity.

As FIG. 1 further illustrates, the AFT sensor(s) 22 is/are connected to AFT sensing circuit(s) 26 and the RH sensor(s) 24 is/are connected to RH sensing circuit(s) 28. In certain scenarios, the AFT sensing circuit 26 is a resistance-sensing circuit configured to sense, detect, and/or measure changes in the resistance of and/or between at least one pair of AFT sensors 22. In some cases, the AFT sensors 22 include at least one pair of thermistors, in which one thermistor of the pair is a temperature sensing thermistor being heated to the temperature of the airstream and the other thermistor of the pair is a self-heated thermistor used to measure the airflow (i.e., the velocity or flow rate of the airstream) via thermal dispersion. The AFT sensing circuit 26 measures the resistance of the temperature sensing thermistor and the change in resistance between the temperature sensing thermistor and the self-heated thermistor. The AFT sensing circuit 26 then outputs the measured resistance data as a resistance sensor signal to the transmitter 30. The transmitter 30 then calculates the airflow and temperature of the airstream based on the resistance data. The transmitter 30 can calculate the enthalpy of the airstream from the temperature and humidity data obtained from AFT and RH sensing circuits 28. System 10 can calculate the volumetric or mass airflow, where desired.

Similarly, and in certain scenarios, the RH sensing circuit 28 is a resistance or capacitance sensing circuit configured to sense, detect, or otherwise measure the resistance or capacitance and/or changes in resistance or capacitance for the RH sensor 24 or sensors. In those or other scenarios, the RH sensing circuit 28 detects changes in the resistance or capacitance of the one or more RH sensors 24 to determine the amount of moisture present in the airstream. The RH sensing circuit 28 outputs the resistance or capacitance data as a sensor signal to the transmitter 30. The transmitter 30 can use the signals derived from RH sensing circuit(s) 28 in combination with the signals derived from AFT sensing circuit(s) 26 and the absolute pressure sensor 25, to calculate the enthalpy of the airstream. The temperature, thermal dispersion airflow, dew point, enthalpy, and/or relative humidity parameters are useful for managing, monitoring, troubleshooting, and/or controlling aspects of an HVAC system.

Still referring to FIG. 1, the transmitter 30 may comprise a processor 32, memory 34, and one or more interfaces 36. The interfaces 26 are configured to send and receive data in the form of analog output signals, digital output signals, infrared output signals, and/or radio-frequency (RF) output signals, where desired. The transmitter 30 may send and receive any type of signal not inconsistent with the disclosed subject matter. The transmitter 30 acquires or receives data (i.e., resistance and/or capacitance sensor signals) from at least one airstream sensor device 20, and in some scenarios, the transmitter 30 acquires or receives data from multiple devices 20. For example and in some scenarios, a single transmitter 30 can receive and process data from between 1 and 4 devices. However, a transmitter 30 that receives and processes data from more than 4 devices is also contemplated.

The processor 32 can receive and process data from the multiple sensor devices 20. The processor 32 can receive data in the form of signals indicative of resistance and/or capacitance changes, and process the data via executing an algorithm stored in memory 34. The multi-point data received from one or more devices 20 is used to calculate parameters such as the average airflow, temperature, and enthalpy of an airstream or individual parameters at discrete locations in an airstream. The processor 32 can comprise a physical hardware processor including a single core or multiple cores. The processor 32 may also be a virtual processor that runs on a hypervisor layer controlling remote access to the underlying processor hardware. The processor 32 can store the airstream data in storage 38 and/or display to a display screen similar to as shown in FIGS. 8 and 9. The data can comprise airflow, temperature, relative humidity, pressure, density, dew point, and/or enthalpy data being simultaneously or substantially simultaneously acquired by an acquirer 39 such as, without limitation, an HVAC user, an HVAC technician, an HVAC controller, a building management system or unit, a building automation system, a computing platform, or manually via an RF device during installation, maintenance, and/or troubleshooting operations. Additionally, the data can optionally be displayed on a graphical user interface of the transmitter 30 or the acquiring entity, where desired.

The transmitter memory 34 may be volatile or nonvolatile memory that stores instructions executed by the processor 32. The memory 34 may be a physical memory chip or virtualized memory that is mapped to one or more physical memory chips by a hypervisor layer. In some scenarios, at least two or more of a temperature algorithm, a thermal dispersion airflow algorithm, a relative humidity algorithm, and an enthalpy algorithm are stored in the memory 34 for execution by the processor 32 to calculate the respective temperature, airflow, relative humidity, and enthalpy of an airstream from multiple points in the airstream. As noted earlier, individual temperature, airflow, or enthalpy values for each sensor in the system 10 can be calculated or averages of the airstream temperature, airflow, and enthalpy can be calculated. The temperature, airflow, and enthalpy values for various zones, devices 20, and/or locations in an HVAC system are calculated for use in controlling or managing the system. The processor 32 can execute algorithms stored in memory 34 for computing various airstream parameters and data.

The transmitter 30 is configured to send and receive data via the one or more interfaces 36. The temperature, airflow, RH, and/or enthalpy data may be simultaneously communicated as individual or averaged points to the acquirer 39 or acquiring entity in response to a request, an inquiry, a trigger, an alarm, according to a schedule, on-demand, or at any time and according to any method not inconsistent with the instant disclosure. The interfaces 36 can comprise one or more wired network interfaces, wireless network interfaces, RF interfaces, infrared interfaces, graphical user interfaces, touch screen interfaces, push-button interfaces, or any other type of interface not inconsistent with the instant subject matter.

The airstream data can be acquired from devices 20 directly or indirectly, and then processed into airstream data and sent to another entity (i.e., an acquirer 39) via interfaces 36. In some scenarios, the interfaces 36 are configured to receive electrical data (i.e., resistance or capacitance sensor signals) and then transmit the airstream parameters, simultaneously, to the acquirer 39 (e.g., a controller, user, building management system, reader, technician, computer, server, etc.). The acquirer 39 may use the airstream parameters to implement and/or effect management and control decisions in an HVAC system. One such decision may include analyzing the airflow, temperature, relative humidity, and/or enthalpy parameters to determine whether to heat or cool a space using air supplied from the HVAC system or outside air. After computing the various airstream parameters, the transmitter 30 can send the airstream data to a remote acquiring source (e.g., HVAC controller) or a local acquiring source (e.g., handheld reading device), which may be an HVAC control or management entity, where desired.

Additionally, the airstream data calculated at transmitter 30 may be displayed to a user via a display interface of the transmitter 30, where desired as shown in FIGS. 8 and 9. It will further be appreciated that the transmitter 30 can be programmed to sound an audible alarm, emit a visible alarm, and/or transmit an alarm signal to the acquiring source when the temperature, airflow, enthalpy, and/or relative humidity measurements are outside of a specified range, exceed a specified limit, or fail to comply with any other programmed parameter consistent with the instant disclosure. The system and devices described herein are also ventilation compliant with the ASHRAE 62.2 standard.

It will be appreciated that FIG. 1 is for illustration purposes only, and that the sensor system 20 is not limited to the specific architecture depicted in the figure. Numerous modifications and adaptations can be made without departing from the instant subject matter disclosed herein.

FIG. 2 is a schematic diagram of a probe airstream sensor device, generally designated 20A. The device 20A comprises, consists and/or consists essentially of a housing 12 and a plurality of sensors $S_1$-$S_N$ ("N" being a whole number integer >2) disposed on, over, and/or in the housing 12. The device 20A can be mounted in a duct or plenum space for obtaining various airstream parameters at individual or multiple points in an HVAC system. Any number (quantity) of sensors $S_1$-$S_N$ not inconsistent with the instant subject matter may be provided per device 20A, and the number of sensors provided on each device 20A can vary based on the length, width, or size of the device 20A being used to measure an airstream. The table below contains the exemplary number or quantity of sensors $S_N$ that may be disposed on, over, and/or at least partially within the devices 20A described herein. Notably, the devices 20A described herein employ multiple sensors $S_1$-$S_N$ for implementing multi-point sensing technology.

TABLE 1

| Quantity of Sensors Per Device |
| --- |
| 3 |
| 4 |
| 5 |
| 6 |
| 7 |
| 8 |
| 9 |
| 10 |
| 12 |
| 14 |
| 16 |
| 18 |
| 20 |
| 34 |
| 32 |
| <65 |
| <33 |
| <20 |

Turning now to the device housing 12, and in some cases, the housing 12 comprises a first end 12A and a second end 12B that is opposite from and/or opposes the first end. A plurality of sensor openings 13 are formed in the housing 12, from which the sensors $S_1$-$S_N$ can at least partially protrude, extend and/or by which the sensors $S_1$-$S_N$ are retained in the housing 12. In certain scenarios, the sensors $S_1$-$S_N$ comprise sensor inserts that are inserted, mounted, and/or retained within portions of the sensor openings 13. Where the sensors $S_1$-$S_N$ are sensor inserts, such inserts can be retained via one or more retaining members, such as set screws, pins, hooks, clips, clamps, or any other retaining member not inconsistent with the instant subject matter. The sensors $S_1$-$S_N$ can be provided on a downstream facing side or surface of the device 20A for facing the airstream and obtaining optimal readings. As noted in FIG. 2, the airstream being measured is directed into the paper, for example, along a z-axis.

In certain scenarios, the housing 12 comprises an elongated probe body or probe housing configured to house and/or at least partially enclose and retain the sensors $S_1$-$S_N$ therein. Alternatively, a non-elongated body is also contemplated, for example, as the devices described herein are not limited to probes, but may comprise any type of handheld or mounted airstream measurement device not inconsistent with the instant disclosure. The housing 12 can comprise any shape in a planar view, for example, an elongated tube/rod/bar/strut/shaft shape, a rectangular shape, a circular shape, a non-circular shape, a louver shape, a damper shape, or any other shape not inconsistent with the instant subject matter. The housing 12 can further comprise any sectional shape, for example, a circular sectional shape (i.e., for round ducts), a non-circular sectional shape, a square sectional shape, an oval sectional shape, a rectangular sectional shape, a symmetric sectional shape, an asymmetric sectional shape, a regular sectional shape, or an irregular sectional shape.

In some cases, the housing 12 comprises a hollow, tubular body having a conduit or aperture formed therein for encasing or enclosing various components, such as electrical circuitry components (e.g., PCBs), electrical connectors (e.g., traces, wires, interconnects, etc.), and/or communication links or components (e.g., cable(s)) for minimizing interference between such components and the airstream. The housing 12 can further comprise an aerodynamic shape and/or aerodynamic surfaces that are curved or rounded for minimizing disruptions in the airstream that may be caused as the airstream passes on, over, or through portions of the device 20A.

As FIG. 2 further illustrates, the housing 12 can comprise a length L and a width W. The width W is a diameter, for example, where the housing 12 has a circular cross-sectional shape. Exemplary housing lengths L and widths are set forth in the tables below. The housing 12 can comprise any size and/or shape not inconsistent with the instant subject matter disclosed herein.

TABLE 2

| Exemplary Housing Length (L) |
| --- |
| 4 inches (in)-20 feet (ft) |
| 1-20 ft |
| 1-16 ft |
| 2-20 ft |
| 2-16 ft |
| 2-10 ft |
| 5-10 ft |
| 4 in.-16 ft |
| 4 in.-10 ft |
| <20 ft |
| <16 ft |
| <10 ft |
| <2 feet |

TABLE 3

| Exemplary Housing Width (W) in one or two directions |
| --- |
| 1 millimeter (mm)-12 inches (in) |
| 1 mm-6 in |
| 1 mm-2 in |
| 1 mm-1 in |
| 5 mm-6 in |
| 5 mm-2 in |
| 5 mm-1.5 in |
| 1-6 in |
| 1-2 in |
| <12 in |
| <6 in |
| <2 in |

Turning now to the electrical sensing aspect of the airstream sensor devices 20A described herein, the plurality of sensors $S_1$-$S_N$ are configured to sense, measure, and/or detect changes in electrical resistance or capacitance in response to an airstream passing over the device 20A. The changes in electrical resistance or capacitance are used to calculate various airstream parameters associated with an airstream being measured by a device 20A. The parameters may include, for example and without limitation, the airflow, temperature, relative humidity, and/or enthalpy of the airstream being measured. Such parameters can be used to control, manage, troubleshoot, or monitor a heating, ventilating, and air conditioning (HVAC) system. The airstream measured via sensors $S_1$-$S_N$ can comprise a supply airstream, a return airstream, or an outside airstream being supplied and/or received from an outdoor (outside) source or location.

In some instances, the distance or space between adjacent sensors can be varied per device 20A and/or sensing application. For example, the distance between sensors may depend on the size of the duct or space in which the devices is to be located, meeting customer requirements, or applications in which more or less sensor points are needed to obtain a desired or required airstream sampling. In some scenarios, the distance between sensors may measure between about 0.5 inches (in) and 6 feet (ft), or any subrange therebetween (e.g., 0.5-12 in, 0.5-6 in, 1-36 in, 1-24 in, 1-12 in, 1-6 in, 1-2 in, etc.) depending on the size and/or shape of the device 20A. The distance between sensors may be less than about 24 inches, less than about 12 inches, less than about 6 inches, or less than about 2 inches.

Additionally, and in some scenarios, adjacent sensors $S_1$-$S_N$ in a device are spaced apart at equal distances over the housing 12. Alternatively, adjacent sensors $S_1$-$S_N$ in a device are spaced apart at unequal distances over the housing 12. For example, the first sensor $S_1$ can be spaced apart from the adjacent second sensor $S_2$ by a first distance $D_1$ and the second sensor $S_2$ can be spaced apart from the adjacent $N^{th}$ sensor $S_N$ by a second distance $D_2$. The respective first and second distances $D_1$, $D_2$ can be equal or unequal. Where unequal, the first and second distances $D_1$, $D_2$ can vary by about 0.5 in, 1 in, 2 in, 0.5-12 in, 1-6 in, or less than 12 in. Sensors may be spaced apart at any distance(s) over housing 12, equal or unequal, not inconsistent with the instant subject matter. Such spacing may depend, for example and without limitation, on the size of the device 20A or the space incorporating the device 20A (e.g., a duct or plenum space). The distance(s) between the adjacent sensors $S_1$-$S_N$ can comprise any distance(s) not inconsistent with the instant subject matter. Although only three sensors are shown in FIG. 2 for illustration purposes only, it will be appreciated that a single device 20A can comprise more than three sensors.

Further, the end-most sensors (i.e., sensors $S_1$, $S_N$ that are disposed proximate the ends 12A, 12B) may be located or disposed at any inboard distance $D_0$ relative to the respective first and second ends 12A, 12B. The inboard distance $D_0$ can measure between 1 and 72 in, or any other subrange therebetween (e.g., 12-72 in, 12-60 in, 6-60 in, 1-24 in, 1-12 in, 1-6 in, <72 in, <60 in, <36 in, <24 in, <6 in, <4 in, etc.). The inboard distance $D_0$ may vary depending on the size of the device 20A and/or the space incorporating the device 20A (e.g., a duct or plenum space). The inboard distance $D_0$ can comprise any distance not inconsistent with the instant subject matter. Notably, the one or more RH sensors (described in more detail below) provided for each device 20A are not restricted to placement on, adjacent to, or at the duct wall, but can be positioned so that the sensors sample air from the bulk airstream. The RH sensors can be spaced apart from each duct wall by at least about 2 in, at least 4 in, at least 6 in, at least 12 in, at least 20 in, at least 36 in, or any distance between about 2-36 in. Such placement improves the measurements and renders the RH information obtained more consistent with other sensor readings.

The one or more of the sensor devices 20A can be sized and/or shaped for disposal in one or more duct(s), plenum space(s), transition space(s), elbow(s), and/or any other portion of an HVAC system not inconsistent with the instant subject matter. Notably, the length L of the device 20A can substantially correspond to an opening of a duct, the distance between opposing inner walls of a duct, or a distance between mounting surfaces in a space of an HVAC system. Mounting elements 14 are disposed at the first and/or second ends 12A, 12B of the device 20A for mounting, connecting, attaching and/or securing devices 20A to portions of the HVAC system.

The mounting elements 14 can comprise mounting brackets, plates, supports or any other type of mounting element not inconsistent with the instant application. The device 20A may be movable or rotatable relative to portions of the mounting elements 14 before being locked or fixedly retained in a given position. Further, the mounting elements 14 may extend, retract, or slide to change size, shape, or orientation. Any size and/or shape of mounting element 14 consistent with the instant subject matter can be used. The mounting elements 14 provide versatile mounting options which allow devices 20A and respective sensors $S_1$-$S_N$ to be placed in even the most challenging field locations for measuring the airstreams in such locations.

Device 20A may be permanently or semi-permanently locked or fixed in a given position and location in an HVAC system via mounting elements 14 and one or more fastening members 15. The fastening members 15 may include, without limitation, screws, nails, dowels, pins, hooks, fasteners, clips, clamps, or bolts used to secure the device 20A to the HVAC system via locking the device 20A within a portion of mounting element 14. For example, the fastening members 15 can extend through portions of the device 20A, mounting element 14, and/or adjacent HVAC structure (e.g., an inner wall of a duct, a wall of a plenum space, etc.) to secure the device 20A to the HVAC system.

In some cases, the housing 12 and/or mounting elements 14 can comprise or be formed from a metal or a metal alloy, such as aluminum, stainless steel, copper, or any other metal or metal alloy not inconsistent with the instant subject matter. The metal or metal alloy forming the housing 12 and/or mounting elements 14 can optionally be treated (e.g., via heat treating, anodizing, coating, passivating, chemical treating, mechanical treating, etc.) for improved stability and durability, where desired.

Each device 20A is configured to measure at least the airflow, temperature, and relative humidity of an airstream that passes through various points and locations in the HVAC system. The measurements can be used, for example and without limitation, for outdoor air delivery monitoring, differential airflow tracking, troubleshooting, HVAC control and management, assuring compliance with ventilation requirements, system performance monitoring, or any other application not inconsistent with the instant subject matter. In some scenarios, the airflow, temperature, and relative humidity measurements are associated with a return, supply, and/or outside airstream in an HVAC system.

The sensor measurements can be used to determine the source of the supply airstream, as well as the timing and/or duration of using the source of the supply airstream. For example, the measurements can be used to determine whether the source of the supply airstream is an outside airstream or a cooled/heated airstream supplied by the HVAC system. Cooling or heating a structure via outside air for any period of time advantageously allows the respective HVAC compressor or heating elements of the HVAC system to be turned off, which can contribute to significant energy savings and improves the energy efficiency of the respective HVAC system.

Furthermore, the enthalpy values can be used to determine the total power of heat exchanged in the airstreams added or removed by heat transfer equipment. Such information can be used to determine effectiveness of the heat exchanger or for energy efficiency, and over time, could show degradation or be used to troubleshoot various operational issues.

Notably, the temperature and relative humidity measurements obtained via sensors $S_1$-$S_N$ can be used to calculate the enthalpy of the airstream passing over each device 20A for determining when to use conditioned or heated air versus outside air. The airflow measurements obtained via sensors $S_1$-$S_N$ are used to assure compliance with ventilation and air quality requirements. Making decisions, for example, in regards to whether to use HVAC air (i.e., heated or cooled supply air) or outside air based on the temperature, enthalpy and airflow measurements allows energy savings to be realized without having to compromise indoor air quality, required ventilation, and/or comfort. By increasing the amount of outdoor air used to cool a structure when the enthalpy of the outside air temperature is lower in temperature and/or enthalpy of the return air, energy and costs savings may be realized. The sensor devices 20A described herein utilize co-located and/or co-planar sensors $S_1$-$S_N$, which further improves the accuracy and repeatability of the airstream measurements being obtained.

Still referring to FIG. 2, at least some of the sensors $S_1$-$S_N$ comprise AFT sensors 16 configured to sense both the airstream temperature and the airflow of an airstream passing over the respective device 20A. The AFT sensors 16 are resistance sensors that measure/detect the resistance or changes in resistance as the airstream temperature increases or decreases. The temperature and airflow data can be calculated and determined, in part, by comparing the resistance data obtained from the AFT sensors 16 during operation to resistance data obtained during calibration of the sensors 16. In one implementation, the AFT sensors 16 can comprise thermistors that meet NIST-traceable calibration standards, which are factory calibrated for airflow ranges of 0 to 5,000 feet per minute (fpm) at sixteen calibration points and calibrated for temperature ranges of range of −20 to 160° F. and three calibration points. The AFT sensors 16 are in one implementation accurate within +/−2% of the airstream airflow and within +/−0.15° F. of the airstream temperature.

In some cases, the AFT sensors 16 comprise thermistors by which temperature and airflow can be calculated based on changes in resistance through a resistance sensing circuit. The AFT sensors 16 can comprise, or be formed from, hermetically sealed, bead-in-glass thermistor probes, which are accurate and relatively durable and stable at temperatures between −20 and 160 degrees Fahrenheit (°F), or any subrange thereof, and a humidity between 0 and 100%. In some scenarios, at least one AFT sensor 16 can be a thermistor configured to measure the airstream temperature and at least one other AFT sensor 16 is a thermistor that is self-heated to a preferential temperature by a constant power for measuring airflow (i.e., an airstream velocity or flow rate). In those or other scenarios, the temperature is at least 10 degrees Fahrenheit (°F) above the airstream temperature for detecting the airflow, at least 20° F. above the airstream temperature for detecting the airflow, at least at least 50° F. above the airstream temperature for detecting the airflow, or between 10-60° F. above the airstream temperature. As the airstream velocity or flow rate increases, the temperature difference between the AFT sensors 16 decreases. The temperature difference is reflected as a difference and/or change in resistance values across the pair of AFT sensors 16. The AFT sensors 16, via a resistance-sensing circuit, will detect the changes in resistance and communicate the changes as output resistance sensor signals carried by electrically conductive circuit elements 18 and an output cable 19. The output resistance sensor signals are sent to and received by a transmitter (i.e., 30, FIG. 1).

Further, the sensors $S_1$-$S_N$ comprise at least one RH sensor 17 configured to measure the relative humidity of the airstream passing over device 20A. In some scenarios, the RH sensor is a capacitive type humidity sensor comprising a hygroscopic material, such as a polymeric humidity-sensing film, disposed between electrodes. The hygroscopic material can comprise a thermo-set polymer, a thermoplastic polymer, or any other type of material not inconsistent with the instant subject matter.

A capacitance sensing circuit is configured to detect changes in capacitance of the RH sensor 17 and determine the amount of moisture present in the airstream. The capacitance sensing circuit is configured to detect the capacitance (or changes in capacitance) of the humidity RH sensor 17 and communicate the capacitance information as one or more output capacitance sensor signals via electrically conductive circuit elements 18 and output cable 19. The output capacitance sensor signal is sent to and received by a transmitter (i.e., 30, FIG. 1). The transmitter can utilize the signals received from the sensor device 20A to calculate various airstream parameters, such as the temperature, airflow, and enthalpy of the airstream. The airstream parameters can be output to an acquiring entity or acquirer (i.e., 39, FIG. 1), which may use the output for controlling, managing, and/or monitoring aspects of an HVAC system. Systems utilizing the airstream sensor devices 20A described herein may be more energy efficient, cost efficient, spatially efficient, and may have improved comfort during heating and/or cooling for a space, whether using conditioned or outside air.

Further in regards to FIG. 2, it is noted that the first end 12A of the housing 12 forms a proximal end that is more proximal to the output cable 19 of the device 20A and the second end 12B forms a distal end that is more distal to the output cable 19. The sensors $S_1$-$S_N$ in FIG. 2 are but one illustration of the sensor locations, spatial locations, spacing distances, and sensor ordering. For example, as FIG. 2 illustrates, the AFT sensors 16 are disposed proximate the first and second ends 12A and 12B and the RH sensor 17 is disposed proximate a center point of the housing 12. However, it is understood that the RH sensor 17 may also be disposed proximate the first and/or second ends 12A, 12B and the AFT sensors 16 may be disposed proximate the center point of the housing 12. Further, the AFT sensors 16 may be directly adjacent to each other or directly adjacent to one or more RH sensors 17. It is also contemplated that multiple RH sensors 17 are disposed directly adjacent to each other within the housing 12. More than one RH sensor 17 may be provided per device 20A, where desired. Each sensor $S_1$-$S_N$ is configured to communicate electrical data, signals, or information (e.g., resistance or capacitive sensor signals) to the output cable 19 via various circuit elements 18 comprising electrical connectors or components (e.g., traces, wires). A single output cable 19 can communicate the data received from the multiple sensors $S_1$-$S_N$ to a transmitter. The transmitter can serve as a single point of communication configured to collect all sensor signals from sensor device 20A and transmit all outputs to a data acquisition source.

It is appreciated that FIG. 2 is for illustration purposes only, and that the sensor device 20A is not limited to the specific architecture depicted in the figure. Numerous modifications and adaptations can be made without departing from the instant subject matter disclosed herein.

FIGS. 3A-5E are sectional views of various different sizes and/or shapes of HVAC ducts having one or more airstream sensor devices 20A disposed therein according to embodiments of the presently disclosed subject matter. Each device 20A can connect to a transmitter 30. In FIGS. 3A-5E, the airstream being measured is directed into the paper along the z-axis. The sensor systems 10 and devices 20A set forth herein can also be disposed in plenum space(s), transition space(s), elbow(s), and/or any other portion of an HVAC system not inconsistent with the disclosed subject matter.

FIGS. 3A-3D illustrate round ducts 40A-40D that have a circular or substantially circular cross-sectional shape and FIGS. 4A-4D illustrate square ducts 50A-50D having a squared or substantially squared cross-sectional shape. The ducts in FIGS. 3A-4D comprise a width X in two directions, which may be a diameter where circular ducts are provided. Illustrative duct widths X are in the table below.

TABLE 4

Exemplary Duct Diameters or Widths (X) for Square and Circular Ducts

| 5 inches (in)-24 feet (ft) |
|---|
| 1-20 ft |
| 1-16 ft |
| 2-20 ft |
| 2-16 ft |
| 2-10 ft |
| 5-20 ft |
| 5-10 ft |
| 5 in.-16 ft |
| 5 in.-10 ft |
| <50 ft |
| <10 ft |
| <2 ft |

Figure 3A:
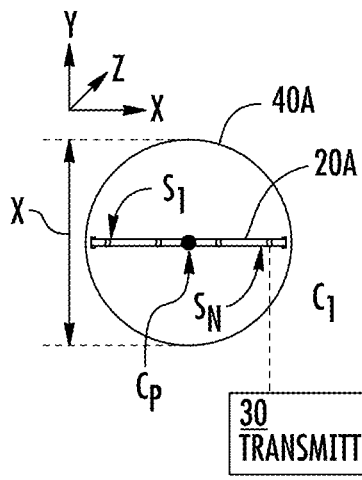
FIGS. 3A-5E provide sectional views of HVAC ducts having airstream sensor devices disposed therein.
Figure 3B:
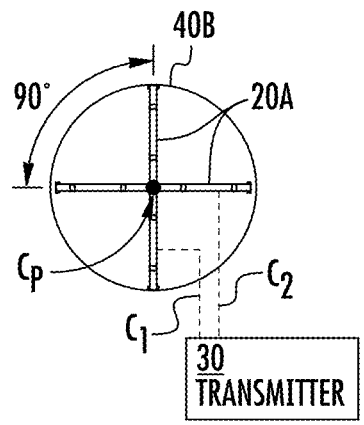
Figure 3C:
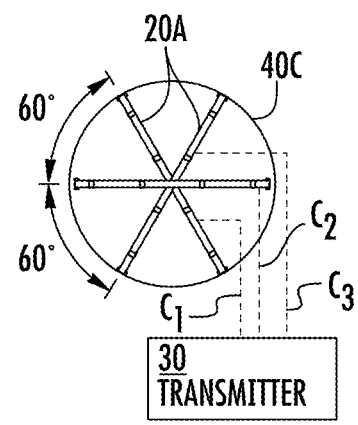
Figure 3D:
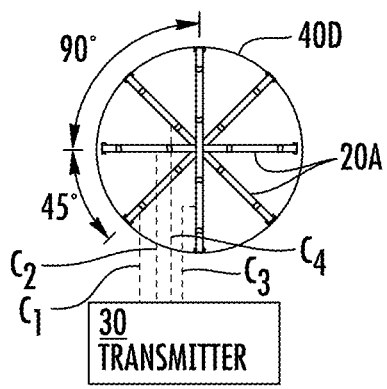

Referring now to FIGS. 3A-3D, the respective ducts 40A-40D comprise a conduit formed between inner walls. A plurality of airstream sensor devices 20A are positioned, mounted, attached and/or otherwise disposed between the inner walls of the respective ducts 40A-40D. FIG. 3A illustrates a single sensor device 20A positioned in the duct 40A and FIGS. 3B-3D illustrate multiple devices 20A disposed in the respective ducts. Where multiple devices 20A are provided, each device is spaced apart from the adjacent devices along the depth of the duct, for example, in the z-direction. The multiple devices 20A can advantageously provide, position, or locate sensors $S_1$-$S_N$ across the entire width X lengths of the duct, which improves the air sampling. Notably, the sensors $S_1$-$S_N$ of each device 20A are disposed along a same plane in the duct, so that the temperature, airstream, and relative humidity readings are sampled from a same plane within a duct.

As FIG. 3A illustrates, the sensor device 20A can pass through a center point $C_P$ of the duct 40A. The device 20A is electrically connected to a transmitter 30 via a wired or wireless communication link $C_1$. As FIG. 3B illustrates, at least two sensor devices 20A can intersect proximate the center point $C_P$ of the duct 40B. The sensor devices 20A can be orthogonally disposed relative to each other within and the duct 40B width W. Each 20A is electrically connected to a single transmitter 30 via wired or wireless communication links $C_1$ and $C_2$.

As FIG. 3C illustrates, three sensor devices 20A can intersect proximate the center point $C_P$ of the duct 40C. The sensor devices 20A can be acutely angled with respect to each other within the duct 40B. Each device can radially extend from the center point $C_P$ of the duct 40C for sampling air at locations disposed across the entire radius and diameter of the duct. Each device 20A is electrically connected to a single transmitter 30 via wired or wireless communication links $C_1$ to $C_3$.

FIG. 3D illustrates four sensor devices 20A disposed in a duct 40D. The devices intersect proximate the center point $C_P$ of the duct 40D, and portions of each device 20A are acutely angled with respect to other devices 20A, or portions thereof. Notably, the devices 20A include a plurality of sensors spaced across the full width X of the duct 40D for improved sampling. The sensor devices 20A are symmetrically disposed relative to the center point $C_P$ of the duct 40C so that symmetric portions or locations of the airstream in the duct 40D are obtained. Each device 20A is electrically connected to a single transmitter 30 via wired or wireless communication links $C_1$ to $C_4$. Having multiple devices 20A connected to transmitter 30 is advantageous in terms of ease of manufacture, ease of installation, ease of maintenance, ease of connectivity thereto, and improved troubleshooting.

Figure 4A:
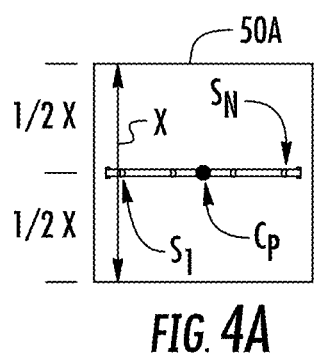
Figure 4B:
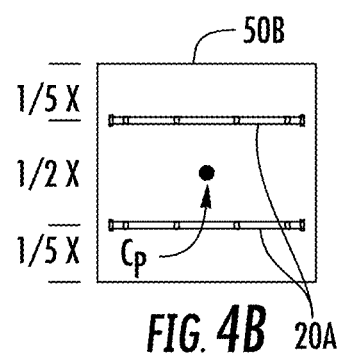
Figure 4C:
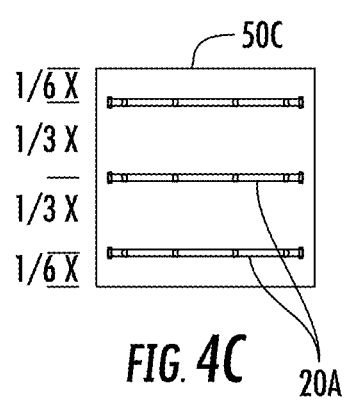
Figure 4D:
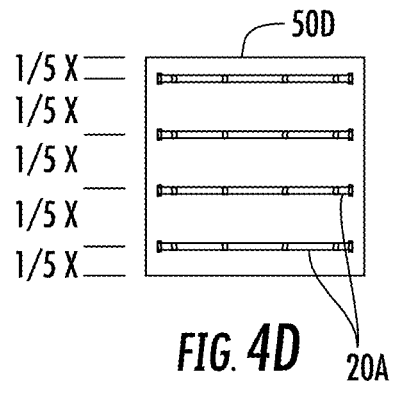

FIGS. 4A-4D illustrate airstream sensor devices 20A disposed in square shaped ducts 50A-50D, respectively. The sensor devices 20A can intersect proximate the center point $C_P$ of the duct 50A as illustrated in FIG. 4A or not intersect proximate the center point $C_P$ of the duct 50B as illustrated in FIG. 4B. Multiple sensor devices 20A can be symmetrically disposed relative to at least one axis of symmetry passing through the center point $C_P$ of the duct 40B for improved, symmetric airstream sampling. Symmetric sampling can improve the monitoring and, thus, control over the HVAC system for improved energy efficiency. In FIG. 5D, the devices 20A are symmetric about more than one axis of symmetry passing through the center point $C_P$, for example, the devices 20A are symmetric about axes disposed along each of the x-, y-, and z-axes. The devices 20A may be mirror and/or rotationally symmetric.

Further, in FIG. 4A a single sensor device 20A is mounted proximate the midpoint of the duct, such that approximately one-half of the duct 40A is above the device 20A and approximately one-half of the duct 40B is below the device 20A. In FIG. 4B, the devices 20A are mounted at various locations (i.e., heights or depths) within the duct 40B that are proximate one-quarter of the width X away from the upper and lower faces of the duct. In FIG. 4C, the devices 20A are positioned proximate the midpoint of the duct at heights or depths of about ⅙ the duct width X. In FIG. 4D, the devices 20A are located at heights or depths of about ⅛ the duct width X. Where multiple devices 20A are disposed in a duct, the devices can be vertically spaced and spaced equal distances apart and extend length-wise along substantially parallel planes within the respective duct. As FIGS. 4A-4D illustrate, the devices 20A can be spaced apart in the y-axis at equal or unequal distances. Equal spacing of devices 20A along the x- and z-axes is also contemplated.

Figure 5A:
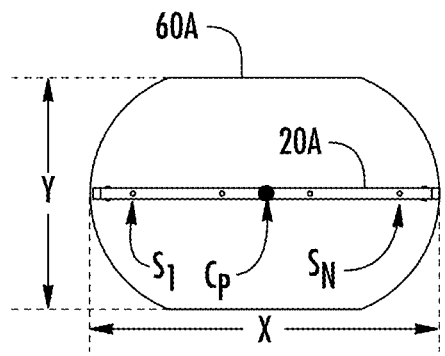
Figure 5B:
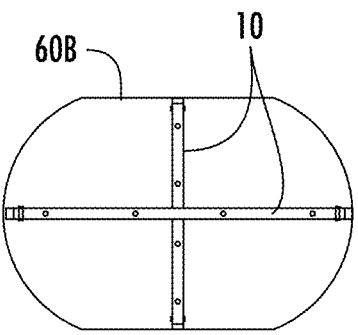
Figure 5C:
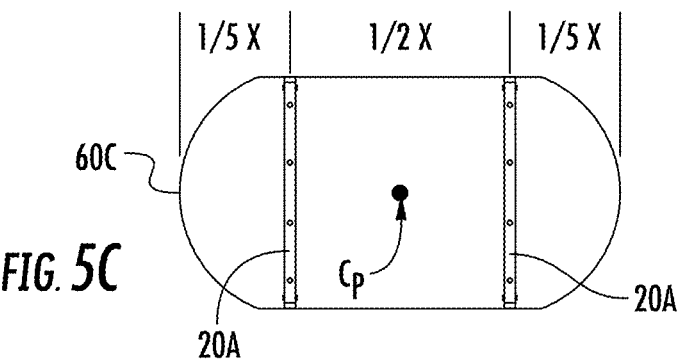
Figure 5D:
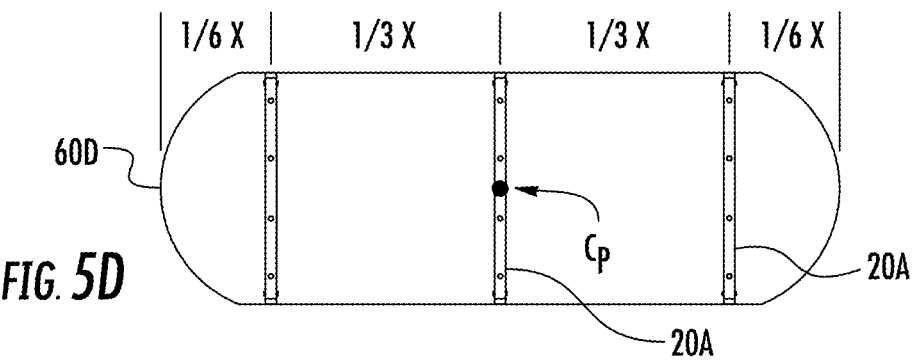
Figure 5E:
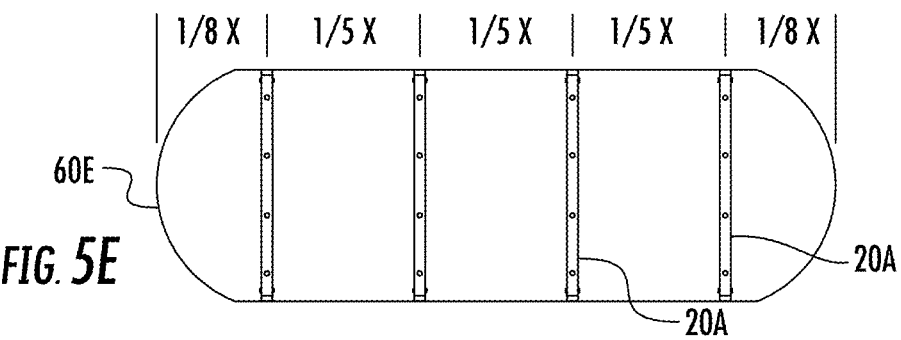
Figure 10:
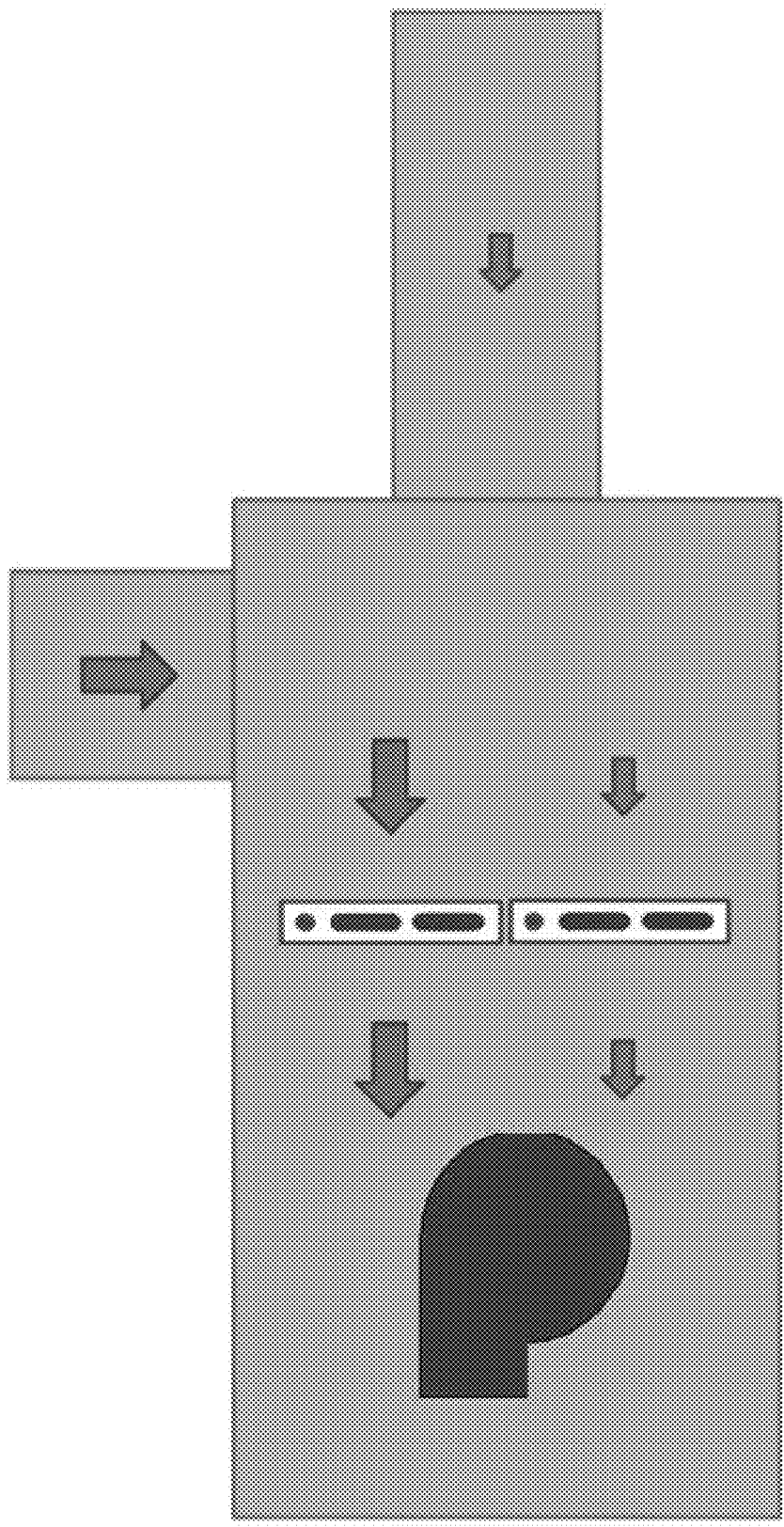
FIGS. 10-13 provide illustrations that are useful for understanding a velocity-weighed temperature.
Figure 11:
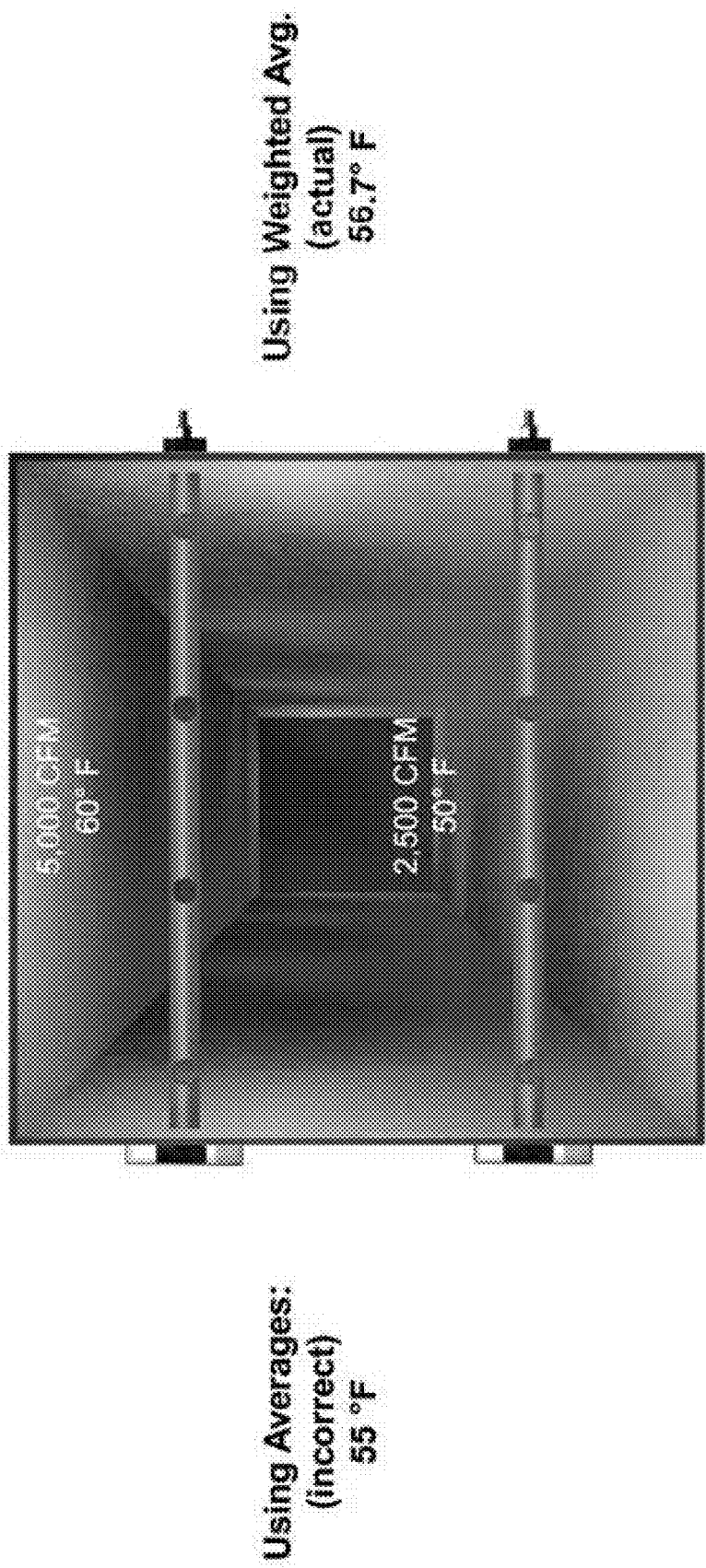
Figure 12:
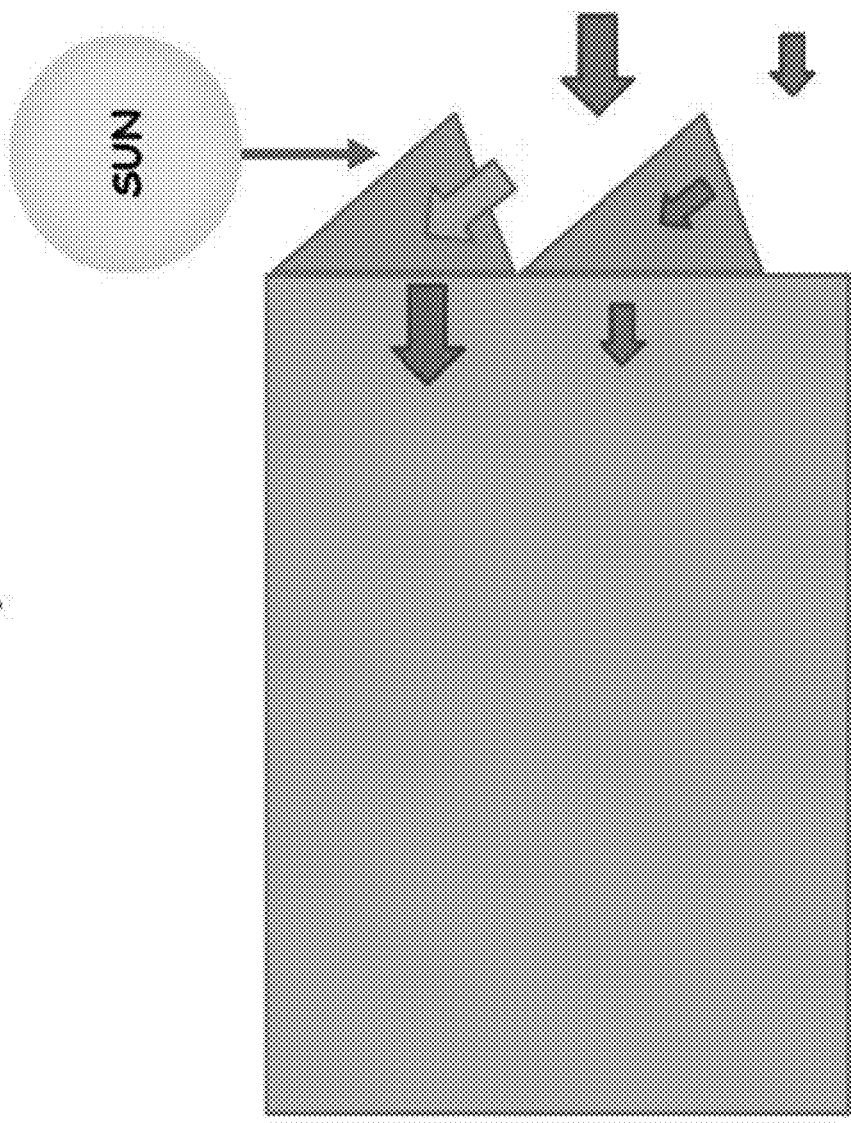
Figure 13:
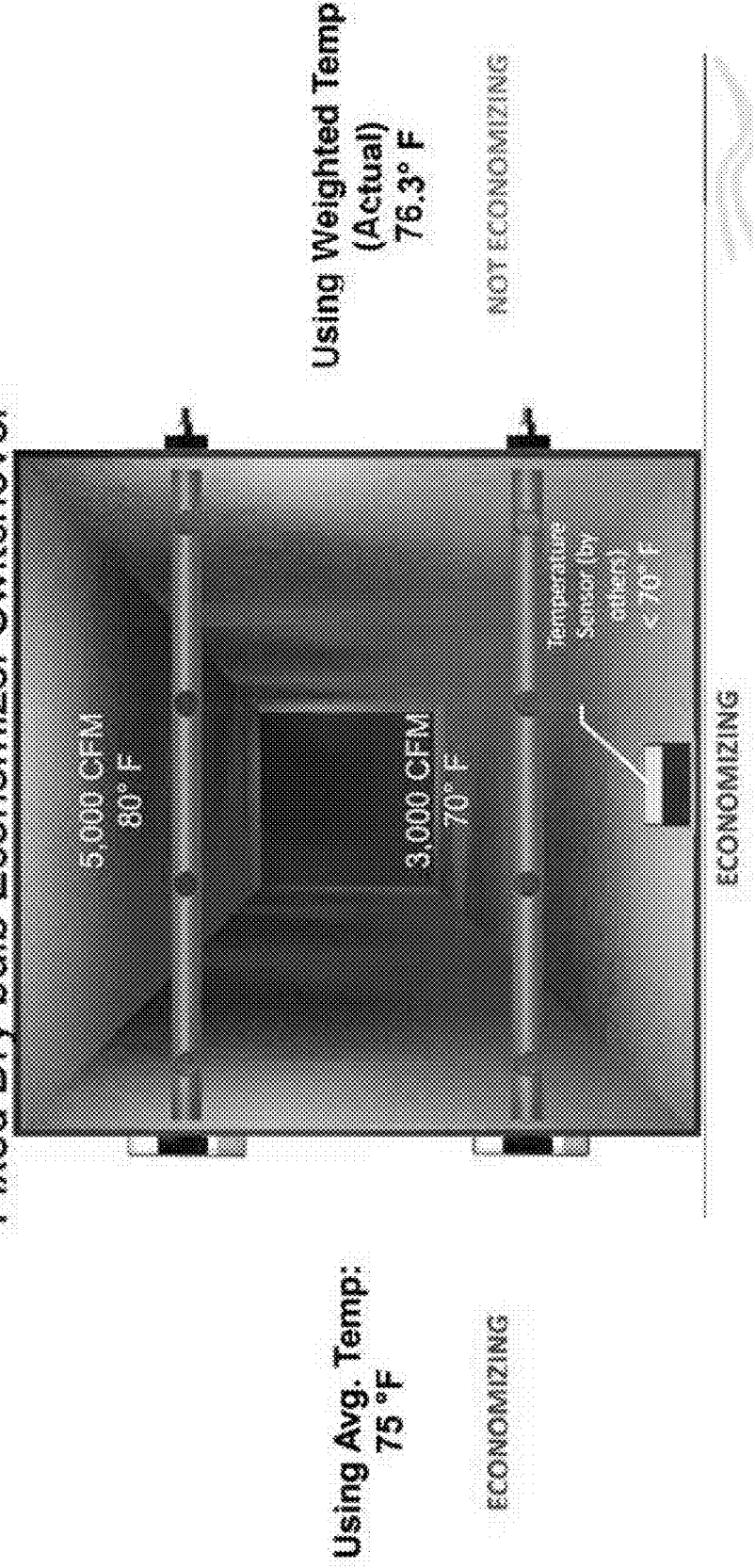

FIGS. 5A-5E illustrate one or more airstream sensor devices 20A disposed in oval shaped ducts 60A-60E, respectively. The sensor devices 20A can intersect at a location proximate the center point $C_P$ of the duct 60A as illustrated in FIG. 5A or not pass through the center point $C_P$ of the duct as illustrated in FIG. 5C. The sensor devices 20A can be symmetrically disposed about one or more axes of symmetry passing through the center point $C_P$ of the ducts for improved airstream sampling, which facilitates improved monitoring and, thus, control over the HVAC system for improved energy efficiency. The sensor devices 20A may be spaced apart in the horizontal direction (i.e., along the x-axis) at equal or unequal distances, and each device 20A may extend length-wise along substantially parallel planes within the ducts. The elongated axis of each sensor device 20A can be substantially parallel to the maximum width or height Y of the duct in the y-direction. Alternatively, the sensor devices 20A may be substantially parallel to a maximum width X of the duct in the x-direction. As FIGS. 5A-5E illustrate, one, two, three or four sensors 20A may be disposed in a given duct. The sensor devices face the airstream supplied to a duct in the z-direction for improved measurements.

FIG. 6 is a block diagram of an exemplary method, generally designated 70, for measuring, collecting, or detecting airstream parameters of an airstream disposed in the path of an airstream sensor device and barometric pressure according to embodiments of the presently disclosed subject matter.

At 72, the method comprise receiving, at a transmitter, a plurality of electrical signals from an airstream sensor device positioned in an airstream, the electrical signals being indicative of a temperature, a thermal dispersion airflow, a barometric pressure, and a relative humidity of the airstream.

At 74, the method further comprises processing, at the transmitter, the electrical signals to obtain a calculated temperature, a calculated airflow, density, dew point, and enthalpy of the airstream.

At 76, the method further comprises transmitting the calculated temperature, the calculated airflow, density, dew point and/or the enthalpy to an acquirer. The relative humidity may also be transmitted The airflow data or parameters, including the temperature, thermal dispersion airflow velocity, relative humidity, and enthalpy can be calculated by a transmitter (30, FIG. 1) and sent to an acquiring source, destination, or entity for use in making decisions relating to HVAC system management and control.

FIG. 7 is a block diagram of an illustrative method, generally designated 80, for monitoring an airstream according to the present solution.

At 82, humidity, airflow, and temperature measurements for an airstream and barometric pressure are received at a first device.

At 84, the density, dew point, and enthalpy of the airstream is calculated at the first device.

At 86, the humidity, airflow, temperature, density, dew point and/or enthalpy are communicated to a second device via the first device.

Referring to FIG. 7, the first and second devices can comprise any device hereinabove not inconsistent with the instant disclosure. For example, and in certain scenarios, the first and second devices can comprise a transmitter and building management system device, respectively. The humidity, airflow, and temperature measurements may be received for multiple individual points, which may optionally be averaged and/or weighted prior to communication to the second device. For example, the humidity, airflow, and temperature measurements may be measured and obtained for multiple points in an airstream, averaged by the number of points, and the average values are communicated to the second device. In other aspects, individual (non-averaged) humidity, airflow, and temperature measurements are communicated to the second device. In yet further aspects, a velocity weighted temperature is calculated and communicated to the second device. Velocity weighted temperature is not merely a straight average of the temperature points, but also takes into account the velocity at the temperature measurement point compared to the others. Thus, the temperature measurement being communicated to the second device is weighted by the velocity (and/or flow amount).

As can be seen from the foregoing disclosure, use of multiple airflow sensors with enthalpy, BTU information can be determined, which can be used to identify operational inefficiencies leading to the consumption of more energy. And, if both flow and enthalpy is measured across these devices, a measure of actual performance can be made.

In certain circumstances, a ventilation latent load may be separated from the zone load. In doing so, dedicated outside air systems may be incorporated along with sensible only or minimal latent capacity zone level cooling units. Examples of these zone units are chilled beams, sensible only terminals, and variable refrigerant flows systems. In these cases, control of the dew point of the volume of airflow to the zones can be important to prevent condensation and excess humidity that could consequently lead to damage or mold growth. Knowing the relative humidity and the temperature, the dew point can be calculated.

Additionally, measuring and controlling the flow and the outdoor airflow and the moisture content can may be important for energy management.

Figure 14:
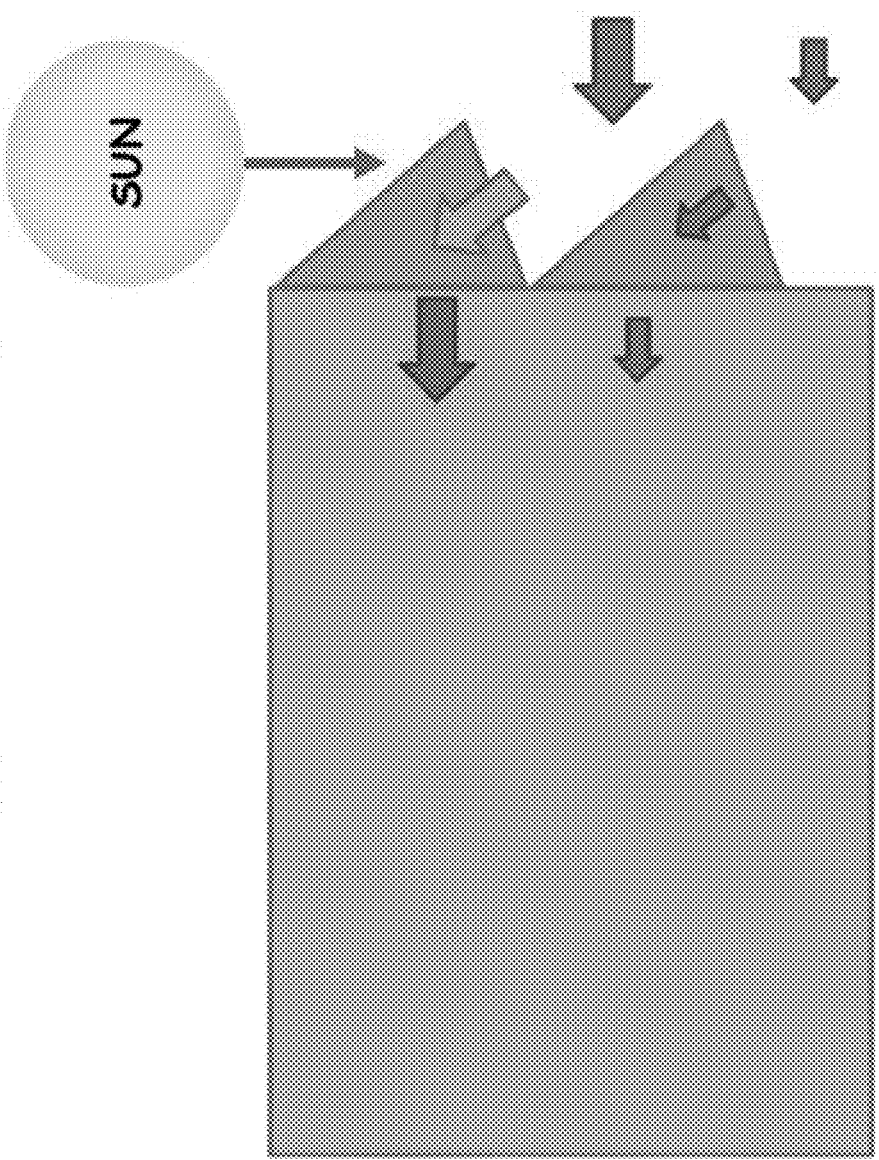
Figure 15:
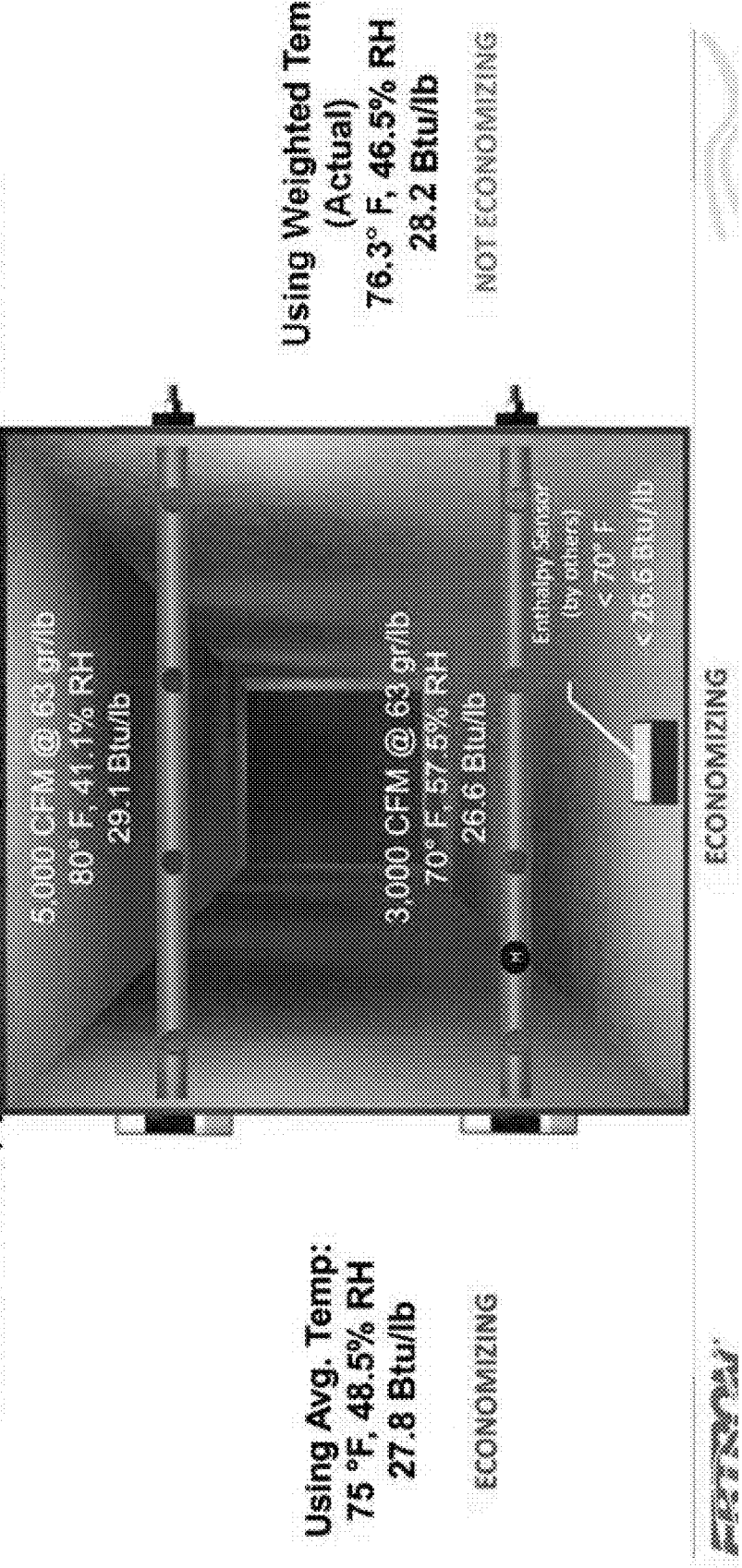

FIGS. 10-13 provide illustrations that are useful for understanding velocity-weighted temperature. FIGS. 14-16 provide illustrations that are useful for understanding velocity-weighted enthalpy. As evident from FIGS. 10-16, the present solution has advantages over the prior art solutions. For example, the present solution provides a system that measures airflow velocity more accurately as compared to the prior art systems. This improved accuracy of airflow velocity is at least partially due to: (i) the independent airflow sensor measurements in a single cross-sectional plane of an air duct; (ii) independent temperature measurements and/or independent humidity measurements in the cross-sectional plane; and (iii) the mathematical weighting of different types of measurements at a particular point in time as opposed to an averaging of a single type of measurement to determine at least one psychrometric property.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A system, comprising:
   at least one airstream sensor device configured to be disposed in an air flow conveyance structure of a heating, ventilation and air conditioning ("HVAC") system, and comprising
      a housing comprising an elongate hollow shaft configured to extend between a first inner wall of the air flow conveyance structure and an opposing second inner wall of the air flow conveyance structure,
      a plurality of openings formed in the elongate hollow shaft so as to be spaced apart along the elongate length of the housing, and
      a plurality of sensors respectively disposed in the plurality of openings formed in the elongate hollow shaft of the housing, and configured to simultaneously measure a temperature, an airflow rate, and a relative humidity of an airstream at a given location within a single cross-sectional plane of the air flow conveyance structure;
   at least one absolute pressure sensor configured to measure an ambient barometric pressure of an atmosphere outside of the air flow conveyance structure; and
   a transmitter communicatively coupled to the at least one airstream sensor device and the absolute pressure sensor, and configured to
      receive humidity measured values, temperature measured values and airflow rate measured values from the at least one airstream sensor device and ambient barometric pressure values from the at least one absolute pressure sensor,
      determine a mass flow rate profile including a plurality of mass flow rate measurements which vary across an air flow within the single cross-sectional plane of the air flow conveyance structure;
      compute a weighted temperature value for the airstream by weighting each of the temperature measured values by a flow amount, wherein the weighted temperature value accounts for variations in the airstream's velocity within the single cross-sectional plane at a plurality of different locations in the air flow conveyance structure;
      use the humidity measured values and the ambient barometric pressure values to determine current specific humidity values for the airstream within the air flow conveyance structure;
      use the current specific humidity values and the weighted temperature value to determine a psychrometric property associated with the airstream at a plurality of points along the single cross-section plane; and
      cause operations of the HVAC system to be controlled based on the determined psychrometric properties and the mass flow rate profile.

2. The system according to claim 1, wherein the psychrometric property comprises an enthalpy value.

3. The system according to claim 2, wherein the transmitter is further configured to communicate at least one of the humidity measured values, the temperature measured values, the weighted temperature value, the ambient barometric pressure, density, dew point, and the enthalpy value to an external device.

4. The system according to claim 2, wherein control of the HVAC system comprises adjusting at least one parameter of the HVAC system based on the determined psychrometric property.

5. The system according to claim 1, wherein the psychrometric property comprises a dew point value.

6. The system according to claim 1, wherein the psychrometric property comprises density.

7. The system according to claim 1, wherein the at least one absolute pressure sensor is in operative communication with a geolocation device.

8. The system according to claim 1, wherein the at least one absolute pressure sensor is in operative communication with a geolocation device including at least one of a global positioning satellite (GPS) receiver, an internet protocol (IP) address, and a lookup table.

9. The system according to claim 1, wherein
   at least one first airstream sensor device is disposed upstream in the airstream of a heat transfer portion of the HVAC system, and
   at least one second airstream sensor is disposed downstream in the airstream of the heat transfer portion of the HVAC system and configured to, in cooperation with the transmitter, determine at least one performance characteristic of the heat transfer portion of the HVAC system.

10. The system according to claim 1, wherein
    at least one first airstream sensor device is disposed upstream in the airstream of the HVAC system, and
    at least one second airstream sensor is disposed in a second airstream converging and mixing with the airstream of the HVAC system of the heat transfer portion of the HVAC system and configured to, in cooperation with the transmitter, to determine the energy balance of mixture processes of the airstream of the HVAC system and the second airstream.

11. The system according to claim 1, wherein the transmitter is further configured to compute a velocity weighted humidity value and a velocity weighted enthalpy value for the airstream based on the humidity measured values.

12. The system according to claim 11, wherein the psychrometric property is determined using the velocity weighted humidity value and the a velocity weighted enthalpy value in addition to the weighted temperature value.

13. The system according to claim 1, wherein the transmitter is further configured to receive airflow measured values from airstream sensor devices including the at least one airstream sensor device, and determine at least two airflow velocity values based on the airflow measured values.

14. The system according to claim 13, wherein the at least two airflow velocity values are used to compute the weighted temperature value in addition to the temperature measured values.

15. The system according to claim 1, wherein the at least one airstream sensor device comprises a relative humidity sensor that is disposed proximate a center point of the housing.

16. The system according to claim 1, wherein at least one airstream sensor device comprises multiple relative humidity sensors.

17. The system according to claim 1, wherein the housing is an elongated probe housing comprising a first end and a second end, and sensors of the at least one airstream sensor device are spaced apart at equal distances between the first end and the second end.

18. The system according to claim 1, wherein the plurality of sensors comprise at least one bead-in-glass thermistor.

19. The system according to claim 1, wherein the plurality of sensors comprise at least one sensor that meets NIST-traceable calibration standards.

20. The system according to claim 1, wherein the at least one airstream sensor device is a probe, a pilot tube, a damper, a flow capture hood, a thermal meter, a vortex shedder, or a measuring louver.

21. The system according to claim 1, wherein the mass flow rate is used to determine an amount of heat transfer of a heat exchanger in the HVAC system.

22. The system according to claim 21, wherein the amount of heat transfer is used to optimize performance of the HVAC system.

23. A method, comprising:
measuring a humidity and a temperature by a plurality of sensors that are (i) respectively disposed in a plurality of openings formed in and spaced apart along an elongate hollow shaft of at least one air stream sensor device and (ii) arranged symmetrically within a single cross-sectional plane of an air flow conveyance structure of a Heating, Ventilation and Air Conditioning ("HVAC") system, wherein the elongate hollow shaft extends between a first inner wall of the air flow conveyance structure and an opposing second inner wall of the air flow conveyance structure;
measuring, by at least one absolute pressure sensor, an ambient barometric pressure of an atmosphere outside of the air flow conveyance structure;
receiving, by a transmitter, humidity measurement values and temperature measurement values from the plurality of sensors and at least one ambient barometric pressure value from the at least one absolute pressure sensor;
determining, by the transmitter, a mass flow rate profile including a plurality of mass flow rate measurements which vary across an air flow within the single cross-sectional plane of an air flow conveyance structure;
computing, by the transmitter, a weighted temperature value for the airstream by weighting each of the temperature measurement values based on a flow amount, where the weighted temperature value accounts for variations in the airstream's velocity within the single cross-sectional plane at a plurality of different locations in the air flow conveyance structure;
using, by the transmitter, the humidity measurement values and the ambient barometric pressure values to determine current specific humidity values for the airstream within the air flow conveyance structure;
using, by the transmitter, the current specific humidity values and the weighted temperature value to determine a psychrometric property at a plurality of points along the single cross-sectional plane; and
causing, by the transmitter, operations of the HVAC system, a building automation system or an application controller to be controlled based on the determined psychrometric property and the mass flow rate profile.

24. An airstream sensing system, comprising:
an airstream sensor device including:
a housing comprising an elongate hollow shaft having a plurality of openings formed therein so as to be spaced apart along an elongate length of the elongate hollow shaft,
a plurality of sensors respectively disposed in the plurality of openings formed in the elongate hollow shaft of the housing, the plurality of sensors configured to simultaneously measure a temperature, a thermal dispersion airflow, and a humidity at a given location within a single cross-sectional plane of an airflow conveyance structure, each of the plurality of sensors being configured to generate electrical signals associated with an airstream passing over the airstream sensor device;
at least one absolute pressure sensor configured to measure an ambient barometric pressure of an atmosphere outside of the air flow conveyance structure; and
a transmitter in electrical communication with the airstream sensor device, and configured to
receive the electrical signals comprising thermal dispersion airflow measurement values, humidity measurement values and temperature measurement values,
compute airflow velocity values based on the thermal dispersion airflow measurement values,
compute a velocity weighted temperature value for the airstream by weighting the temperature measurement values based on the airflow velocity values, wherein the velocity weighted temperature value accounts for variations in the airstream's velocity within the single cross-sectional plane at a plurality of different locations in the air flow conveyance structure of a heat, ventilation and air conditioning ("HVAC") system;
receive humidity measurement values and temperature measurement values from the at least one airstream sensor device and ambient barometric pressure values from the at least one absolute pressure sensor;

determining an elevation, an air density of a surrounding environment, and a mass flow rate profile including a plurality of mass flow rate measurements which vary across an air flow within the single cross-sectional plane of an airflow conveyance structure;
use the elevation and air density to correct airflow rate;
use the humidity measurement values and the ambient barometric pressure values to determine current specific humidity values for the airstream within the air flow conveyance structure;
use the current specific humidity values and the velocity weighted temperature value to determine a psychrometric property at a plurality of points along the single cross-sectional plane; and
cause operations of the HVAC system to be controlled based on the determined psychrometric properties and the mass flow rate profile.

25. The airstream sensing system according to claim 24, further comprising a plurality of airstream sensor devices from which the transmitter is configured to receive electrical signals.

26. The airstream sensing system according to claim 24, wherein the transmitter is configured to simultaneously output the velocity weighted temperature value, the airflow velocity values, and the psychrometric property.

27. The airstream sensing system according to claim 24, wherein the airstream sensor device comprises between two to sixteen temperature sensors, two to sixteen thermal dispersion airflow sensor, and two to four relative humidity sensors.

28. The airstream sensing system according to claim 24, wherein the airstream sensor device comprises two or more relative humidity sensors.

29. The airstream sensing system according to claim 24, wherein the transmitter is integrated with the airstream sensor device.

30. The airstream sensing system according to claim 24, wherein the transmitter is remote from the airstream sensor device.

31. A method of measuring airstream parameters, comprising:
symmetrically and simultaneously measuring a thermal dispersion, a humidity and a temperature of an airstream by a plurality of sensors that are (i) respectively disposed in a plurality of openings formed in and spaced apart along an elongate hollow shaft of an air stream sensor device and (ii) arranged symmetrically within a single cross-sectional plane of an air flow conveyance structure of a Heating, Ventilation and Air Conditioning ("HVAC") system, wherein the elongate hollow shaft extends between a first inner wall of the air flow conveyance structure and an opposing second inner wall of the air flow conveyance structure;
receiving, at a transmitter, a plurality of electrical signals that are generated by the airstream sensor device and that comprise thermal dispersion airflow measurement values, humidity measurement values and temperature measurement values;
receiving, by a transmitter, at least one ambient barometric pressure value from at least one absolute pressure sensor;
computing, by the transmitter, airflow velocity values based on the thermal dispersion airflow measurement values;
computing, by the transmitter, a velocity weighted temperature value for the airstream by weighting the temperature measurement value based on the airflow velocity values, wherein the velocity weighted temperature value accounts for variations in the airstream's velocity within the single cross-sectional plane;
using the humidity measurement values and the ambient barometric pressure values to determine current specific humidity values for the airstream within the air flow conveyance structure using, by the transmitter, the current specific humidity values and the velocity weighted temperature value to determine a psychrometric property at a plurality of points along the single cross-sectional plane;
using, by the transmitter, at least the ambient barometric pressure values to determining, by the transmitter, an elevation, an air density of a surrounding environment, and a mass flow rate profile including a plurality of mass flow rate measurements which vary across an air flow within the single cross-sectional plane of an airflow conveyance structure;
using, by the transmitter, the elevation and air density to correct airflow rate; and
causing, by the transmitter, operations of the HVAC system, a building automation system or an application controller to be controlled based on the psychrometric properties and the mass flow rate profile.

32. The method according to claim 31, further comprising displaying the airflow velocity values, the velocity weighted temperature value, the dew point, the air density, and the psychrometric property on a display screen of the transmitter.

33. The method according to claim 31, wherein the airstream sensor device is disposed in a supply airstream, a return airstream, or an outside airstream.

* * * * *